US009892445B2

(12) United States Patent
Maass

(10) Patent No.: US 9,892,445 B2
(45) Date of Patent: *Feb. 13, 2018

(54) TRANSACTION ARBITER SYSTEM AND METHOD

(71) Applicant: Jorge Arturo Maass, Plano, TX (US)

(72) Inventor: Jorge Arturo Maass, Plano, TX (US)

(73) Assignee: Jorge Maass, Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,070

(22) Filed: May 19, 2014

(65) Prior Publication Data

US 2014/0258017 A1    Sep. 11, 2014

Related U.S. Application Data

(63) Continuation of application No. 14/080,610, filed on Nov. 14, 2013, which is a continuation of application No. 13/938,113, filed on Jul. 9, 2013, now Pat. No. 8,655,771, which is a continuation of application No. 11/190,991, filed on Jul. 27, 2005, now Pat. No. 8,533,097.

(60) Provisional application No. 60/681,567, filed on May 16, 2005.

(51) Int. Cl.
| | | |
|---|---|---|
| *G06Q 40/00* | (2012.01) |
| *G06Q 30/06* | (2012.01) |
| *G06Q 20/10* | (2012.01) |
| *G06Q 30/08* | (2012.01) |
| *G06Q 40/04* | (2012.01) |

(52) U.S. Cl.
CPC ......... *G06Q 30/0611* (2013.01); *G06Q 20/10* (2013.01); *G06Q 30/08* (2013.01); *G06Q 40/04* (2013.01); *G06Q 30/0601* (2013.01)

(58) Field of Classification Search
CPC .... G06Q 30/0611; G06Q 20/10; G06Q 30/08; G06Q 40/04; G06Q 30/0601; G06Q 30/06
See application file for complete search history.

(56) References Cited

U.S. PATENT DOCUMENTS

| | | | | |
|---|---|---|---|---|
| 6,035,288 A | | 3/2000 | Solomon | |
| 6,131,087 A | * | 10/2000 | Luke | G06Q 30/06 705/26.41 |
| 6,571,279 B1 | * | 5/2003 | Herz | G06F 17/30867 707/999.01 |

(Continued)

FOREIGN PATENT DOCUMENTS

WO    WO-0131486 A2 *  5/2001  ............. G06Q 20/04

*Primary Examiner* — Edward J Baird

(57) ABSTRACT

A transaction arbiter system and method is disclosed which incorporates a merchant function database under control of a transaction arbiter that permits merchants to interact in an automated way with bids generated by other merchants. Rather than utilizing fixed price schedules as taught by the prior art, the present invention permits each merchant to define a set of functions which describe how the merchant will respond to a customer request-for-quote for a given product or service. These merchant functions interact with both the customer request-for-quote and the results of other merchant functions to generate a dynamic real-time bidding system which integrates competition among merchant bidders to achieve an optimal consumer price for a given product or service.

37 Claims, 32 Drawing Sheets

(56) References Cited

U.S. PATENT DOCUMENTS

| | | |
|---|---|---|
| 7,200,566 B1 | 4/2007 | Moore |
| 7,249,088 B2 | 7/2007 | Guler |
| 7,269,571 B2 | 9/2007 | Kar |
| 7,330,826 B1 | 2/2008 | Porat |
| 7,430,531 B1 | 9/2008 | Snyder |
| 7,493,280 B2 | 2/2009 | Guler |
| 7,653,583 B1 | 1/2010 | Leeb |
| 7,908,200 B2 | 3/2011 | Scott |
| 8,086,653 B1 | 12/2011 | Walker |
| 8,412,547 B1 | 4/2013 | Leeb |
| 8,533,097 B2 | 9/2013 | Maass |
| 8,655,771 B2 | 2/2014 | Maass |
| 2001/0034631 A1* | 10/2001 | Kiselik ............ G06Q 30/02 705/2 |
| 2001/0039519 A1 | 11/2001 | Richards |
| 2001/0047311 A1* | 11/2001 | Singh ............. G06Q 30/06 705/26.1 |
| 2002/0007324 A1 | 1/2002 | Centner |
| 2002/0026408 A1 | 2/2002 | O Malley |
| 2002/0032621 A1 | 3/2002 | Smith |
| 2002/0046147 A1* | 4/2002 | Livesay ............ G06Q 10/06 705/37 |
| 2002/0046157 A1 | 4/2002 | Solomon |
| 2002/0065762 A1 | 5/2002 | Lee |
| 2002/0083016 A1* | 6/2002 | Dittrich ............ G06Q 30/06 705/80 |
| 2002/0103746 A1 | 8/2002 | Moffett |
| 2002/0116287 A1* | 8/2002 | Schubert .......... G06Q 30/06 705/26.61 |
| 2002/0165771 A1 | 11/2002 | Walker |
| 2002/0165813 A1 | 11/2002 | Lee |
| 2002/0171662 A1 | 11/2002 | Lee |
| 2002/0198818 A1 | 12/2002 | Scott |
| 2003/0004856 A1 | 1/2003 | Brown |
| 2003/0033239 A1 | 2/2003 | Gilbert |
| 2003/0041015 A1 | 2/2003 | Gutta |
| 2003/0088494 A1 | 5/2003 | Lee |
| 2003/0130899 A1* | 7/2003 | Ferguson .......... G06Q 30/0601 705/26.1 |
| 2003/0195810 A1* | 10/2003 | Raghupathy ........ G06Q 20/20 705/20 |
| 2003/0220876 A1 | 11/2003 | Burger |
| 2003/0231168 A1 | 12/2003 | Bell |
| 2003/0236739 A1 | 12/2003 | Borgeson |
| 2004/0015391 A1 | 1/2004 | Dupreez |
| 2004/0015415 A1 | 1/2004 | Cofino |
| 2004/0019494 A1* | 1/2004 | Ridgeway ......... G06Q 10/0637 705/26.1 |
| 2004/0117294 A1* | 6/2004 | Ferraro ............ G06Q 10/087 705/37 |
| 2005/0010484 A1 | 1/2005 | Bohannon |
| 2005/0060242 A1* | 3/2005 | Armstrong ........ G06Q 10/06375 705/28 |
| 2005/0114223 A1 | 5/2005 | Schneider |
| 2005/0139661 A1* | 6/2005 | Eglen ............. G06Q 30/06 235/383 |
| 2006/0010044 A1* | 1/2006 | Harris ............ G06Q 30/00 705/26.43 |
| 2006/0059107 A1* | 3/2006 | Elmore ............ G06Q 10/06 705/64 |
| 2009/0098825 A1 | 4/2009 | Huomo |

* cited by examiner

*Prior Art*

*FIG. 16*     1600

| A | B | C | D |
|---|---|---|---|
| $127.35 | $128.65 | $129.95 | $128.65 |

— 1601

| A | B | C | D |
|---|---|---|---|
| $127.35 | $126.08 | $124.80 | $126.08 |

— 1602

| A | B | C | D |
|---|---|---|---|
| $122.30 | $123.55 | $124.80 | $123.55 |

— 1603

| A | B | C | D |
|---|---|---|---|
| $122.30 | $121.08 | $119.85 | $121.08 |

— 1604

| A | B | C | D |
|---|---|---|---|
| $117.45 | $118.65 | $119.85 | $118.65 |

— 1605

| A | B | C | D |
|---|---|---|---|
| $117.45 | $116.28 | $115.10 | $116.28 |

— 1606

| A | B | C | D |
|---|---|---|---|
| $112.80 | $113.95 | $115.10 | $113.95 |

— 1607

| A | B | C | D |
|---|---|---|---|
| $112.80 | $111.67 | $110.54 | $111.67 |

— 1608

| A | B | C | D |
|---|---|---|---|
| $108.33 | $109.43 | $110.54 | $109.49 |

— 1609

| A | B | C | D |
|---|---|---|---|
| $108.33 | $107.25 | $110.46 | $109.49 |

— 1610

| A | B | C | D |
|---|---|---|---|
| $105.48 | $107.25 | $110.46 | $109.49 |

UM Bid

Regular
| 136.99 | 157.99 | 129.95 | 145.99 |

Minimu
| .23 | .38 | .15 | .25 |

Bid %
| .02 | .01 | .02 | .01 |

☑ One Shot    Bid    Reset

2020

UM Bid

Regular
| 136.99 | 157.99 | 129.95 | 145.99 |

Minimu
| .23 | .38 | .15 | .25 |

Bid %
| .02 | .01 | .02 | .01 |

| 105.48 | 104.43 | 110.46 | 109.49 |

☑ One Shot    Bid    Reset

UM Bid

Regular
| 136.99 | 157.99 | 129.95 | 145.99 |

Minimu
| .23 | .38 | .15 | .25 |

Bid %
| .02 | .01 | .02 | .01 |

☐ One Shot    [Bid]    [Reset]

2120

UM Bid

Regular
| 136.99 | 157.99 | 129.95 | 145.99 |

Minimu
| .23 | .38 | .15 | .25 |

Bid %
| .02 | .01 | .02 | .01 |

127.35     128.65     129.95     128.65

☐ One Shot    [Bid]    [Reset]

*FIG. 22*

```
┌─────────────────────────────────────────────┐
│ ▓▓ UM Bid                        _ □ X      │
├─────────────────────────────────────────────┤
│  Regular                                    │
│  [136.99]    [157.99]   [129.95]   [145.99] │
│                                             │
│  Minimu                                     │
│  [.23]       [.38]      [.15]      [.25]    │
│                                             │
│  Bid %                                      │
│  [.02]       [.01]      [.02]      [.01]    │
│                                             │
│     127.35    126.08     124.8     126.08   │
│                                             │
│   □ One Shot       [  Bid  ]    [ Reset ]   │
└─────────────────────────────────────────────┘
```
— 2210

```
┌─────────────────────────────────────────────┐
│ ▓▓ UM Bid                        _ □ X      │
├─────────────────────────────────────────────┤
│  Regular                                    │
│  [136.99]    [157.99]   [129.95]   [145.99] │
│                                             │
│  Minimu                                     │
│  [.23]       [.38]      [.15]      [.25]    │
│                                             │
│  Bid %                                      │
│  [.02]       [.01]      [.02]      [.01]    │
│                                             │
│     122.3     123.55     124.8     123.55   │
│                                             │
│   □ One Shot       [  Bid  ]    [ Reset ]   │
└─────────────────────────────────────────────┘
```
— 2220

Private sub btnBid_Click(byVal sender as system.object,
                        byVal e as system.eventArgs)
handles btnBid.click If isCopyed=false then copy value ( )

Do
  finish = True
  min = GetMinimumValue ( )

If aBidItem(1). Last > min and aBidItem (1) . out = False then
    Bid (1, min)
    finish = False
  End if If aBidItem (2). Last > min and aBidItem (2) . out = False then
    Bid (2, min)
    finish = False
  End if If aBidItem (3). Last > min and aBidItem (3) . out = False then
    Bid (3, min)
    finish = False
  End if If aBidItem (4). Last > min and aBidItem (4) . out = False Then
    Bid (4, min)
    finish = False
  End if Loop until finish = True End Main
```

End Function
Main

Do finish = True
   min = GetCheapPrice()

If Article(1) .Price > min And Article(1).Out = False Then
      Bid(1, min)
      finish = False
   End If If Article(2) .Price > min And Article(2).Out = False Then
      Bid(2, min)
      finish = False
   End If If Article(3) .Price > min And Article(3).Out = False Then
      Bid(3, min)
      finish = False
   End If If Article(4) .Price > min And Article(4).Out = False Then
      Bid(4, min)
      finish = False
   End If Loop Until finish = True
End Main
```

Private sub Bid(ByVal idx as Int16, ByVal min as double)
Dim BidValue as double

BidValue = Math.Round(CalPercent(min, min,
                     aBidItem(idx).Percent_Dis),2)

If BidValue > aBidItem(idx).minimum then
   aBidItem(idx).Last = BidValue
Else
   aBidItem(idx).Last = aBidItem(idx) . minimum
   aBidItem(idx).Out = True
End if End Function
```

Function Bid(idx,min)

bidValue = Article(idx).Price - Article(idx).Percent

If bidValue > Article(idx).Minimum Then
      Bid = bidValue
   Else
      Bid = Article(idx).LastPrice
      Article(idx).Out = True
   End If Return Bid End Function
```

Function Bid(idx,min)

bidValue = Min - Article(idx).Percent

If bidValue > Article(idx).Minimum Then
      Bid = bidValue
   Else
      Bid = Article(idx).LastPrice
      Article(idx).Out = True
   End If Return Bid End Function
```

Private Function getMinimumValue ( ) as double
   Dim min as double min = aBiditem (1). Last If min > aBidItem(2).Last then
      min = aBidItem(2).Last
   End if If min > aBidItem(3).Last then
      min = aBidItem(3).Last
   End if If min > aBidItem(4).Last then
      min = aBidItem(4).Last
   End if Return min End Function
```

Option Explicit On
Imports System.Math

Public Sub New ()
   InitializeComponent()
   n = 4
   isCopyed = False
End sub

Private Function CalPercent(ByVal Min As Double,
                            ByVal Value As Double,
                            ByVal Perc As Double) As Double
   Return Convert.ToDouble(Min-(Value*Perc))
End Function
```

```
Private Sub CopyValue ( )

aBidItems(1).Last=Convert.Double(txtRegularA.Text)
aBidItems(1).Percent_Min=Convert.toDouble(txtMinA.Text)
aBidItems(1).Percent_Dis=Convert.toDouble(txtBidA.Text)
aBidItems(1).Minimum=Math.Round(
            CalPercent(aBidItem(1).Last,aBiditem(1).Last,
                       aBidItem(1).Percent_Min),)2)
aBidItems(1).Out=False
aBidItems(2).Last=Convert.Double(txtRegularB.Text)
aBidItems(2).Percent_Min=Convert.toDouble(txtMinB.Text)
aBidItems(2).Percent_Dis=Convert.toDouble(txtBidB.Text)
aBidItems(2).Minimum=Math.Round(
            CalPercent(aBidItem(2).Last,
                       aBiditem(2).Last,
                       aBidItem(2).Percent_Min),)2)
aBidItems(2).Out=False
aBidItems(3).Last=Convert.Double(txtRegularC.Text)
aBidItems(3).Percent_Min=Convert.toDouble(txtMinC.Text)
aBidItems(3).Percent_Dis=Convert.toDouble(txtBidC.Text)
aBidItems(3).Minimum=Math.Round(
            CalPercent(aBidItem(3).Last,
                       aBiditem(3).Last,
                       aBidItem(3).Percent_Min),)2)
aBidItems(3).Out=False
aBidItems(4).Last=Convert.Double(txtRegularD.Text)
aBidItems(4).Percent_Min=Convert.toDouble(txtMinD.Text)
aBidItems(4).Percent_Dis=Convert.toDouble(txtBidD.Text)
aBidItems(4).Minimum=Math.Round(
            CalPercent(aBidItem(4).Last,
                       aBiditem(4).Last,
                       aBidItem(4).Percent_Min),)2)
aBidItems(4).Out=False
isCopyed=True End Sub
```

Private Sub btnBid_Click(ByVal sender As System.Object,
                         ByVal e As System.EventArgs)
                         Handles btnBid.Click
   Dim i As Int16
   Dim min As Double
   Dim finish As Boolean
   Dim oneShot As Boolean If isCopyed = False Then CopyValue()

Do
      finish = True
      min = GetMinimumValue()
      If aBidItems(1).Last > min And aBidItems(1).Out = False Then
         Bid(1,min)
         finish = False
      End If
      lblResultA.Text = Convert.ToString(aBidItems(1).Last)
      If aBidItems(2).Last > min And aBidItems(2).Out = False Then
         Bid(1,min)
         finish = False
      End If
      lblResultB.Text = Convert.ToString(aBidItems(2).Last)

If aBidItems(3).Last > min And aBidItems(3).Out = False Then
         Bid(1,min)
         finish = False
      End If
      lblResultC.Text = Convert.ToString(aBidItems(3).Last)

If aBidItems(4).Last > min And aBidItems(4).Out = False Then
         Bid(1,min)
         finish = False
      End If
      lblResultD.Text = Convert.ToString(aBidItems(4).Last)

If ckbOns.Checked Then
         oneShot = False
      Else
         oneShot = True
      End If Loop Until finish = True Or oneShot = True
End Sub
```

Private Sub frmMAin_Load(ByVal sender As System.Object,
                         ByVal e As System.EventArgs)
                         Handles MyBase.Load End Sub Private Sub btnReset_Click(ByVal sender As System.Object,
                           ByVal e As System.EventArgs)
                           Handles btnReset.Click isCopyed = False aBidItems(1).Out = False
   aBidItems(2).Out = False
   aBidItems(3).Out = False
   aBidItems(4).Out = False
   lblResultA.Text = ""
   lblResultB.Text = ""
   lblResultC.Text = ""
   lblResultD.Text = ""

End Sub
```

:# TRANSACTION ARBITER SYSTEM AND METHOD

CROSS-REFERENCE TO RELATED APPLICATIONS

This application is a continuation of U.S. patent application Ser. No. 14/080,610, filed Nov. 14, 2013. U.S. patent application Ser. No. 14/080,610 is a continuation application of a non-provisional application having an application Ser. No. 13/938,113 and a filing date of Jul. 9, 2013, which is a continuation application of a non-provisional application having an application Ser. No. 11/190,991 and a filing date of Jul. 27, 2005, which is a non-provisional application of a provisional application having an application No. of 60/681,567, and a filing date of May 16, 2005. These applications are incorporated by reference herewith.

PARTIAL WAIVER OF COPYRIGHT PROTECTION

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND

Field of Invention

The present invention generally relates to transaction brokering systems, specifically systems which permit consumers to interact with merchants over a communication network to achieve brokered deals for services or merchandise. The present invention augments the prior art by permitting an independent transaction arbiter to act as an interface between consumers and merchants and permit merchant bidding functions to compete within a merchant function database to optimize competition among merchants and present the optimal possible bid to a request-for-quote generated by the customer for a requested product or service.

Description of Related Arts

Overview (0100)

The prior art is generally illustrated in FIG. 1 (0100), wherein a consumer (0101) interacts with a computer interface (0102) to communicate (0103) the specifications of a requested item (0104) to a merchant search engine (0105). This request generally specifies only the description (part number, item name, etc.) of the requested item (0104). The merchant search engine has previously interacted with a number of merchants (0107, 0108) to interrogate price data associated with a number of available items, combining this information into a merchant price database (0106). This merchant price database (0106) is interrogated by the merchant search engine (0105) to provide the consumer (0101) with a list of available prices (normally sorted with lowest price first) available from the list of available merchants (0107, 0108).

Deficiencies in the Prior Art

The major deficiency with the prior art is that the merchant price data (0106) is generally a static quantity and is merely sorted and displayed to the consumer (0101) based on the generation of an item price search request (0104). The merchants (0107, 0108) generally have no opportunity to update their pricing information in response to pricing information generated by other merchants. As a result, the customer (0101) generally does not obtain an optimal price, as there is no active cross bidding between merchants, as there would be in a reverse auction environment.

SUMMARY

Objectives of the Invention

Accordingly, the objectives of the present invention are (among others) to circumvent the deficiencies in the prior art and affect the following objectives:

(1) The ability for consumer to initiate an unattended real-time price competition (bid) from participating merchants in order to obtain the lowest price possible for any service, product or products available for sale anywhere.

(2) Provide a transaction arbiter system which permits active bidding from a variety of merchants to permit cross bidding in response to a customer request-for-quote (RFQ).

(3) Permit merchants to define merchant functions to interact with other functions generated by competing merchants to achieve a dynamic bidding process between merchants in response to a customer request-for-quote (RFQ).

(4) Permit customers to provide additional quote constraint information, such as zip code and other locale information to constrain the bidding process.

(5) Permit customers to incorporate additional constraint information into the bidding process with the merchant functions using this information as a consideration in generating a bid quote.

(6) Permit customers to achieve best optimal bid results in a real-time merchant/manufacturer dynamic bidding environment.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

System Information Flow (0200)

The present invention is generally illustrated in the system information flow of FIG. 2 (0200) wherein the consumer (0201) communicates (0202) a request-for-quote (RFQ) (0203) that fully describes the product item or service being requested and any parameters associated with the bid which may restrict the actual transaction, such as zip code, store/product proximity, maximum price, color, etc., and a plethora of other parameters unique to a given product or service. This RFQ is transmitted to a transaction arbiter (0204) which has previously communicated with a merchant pool (0205) comprising a number of merchants (0206, 0207) to collect merchant functions (0211, 0212) which describe how each merchant (0206, 0207) will respond to quote requests from customers (0201) and also how each merchant (0206, 0207) will respond to bids from other merchants.

These merchant functions (0211, 0212) are assembled in a merchant function database (0208) maintained by the transaction arbiter (0204). The transaction arbiter (0204) accepts request-for-quotes (0203) and applies these requests to the merchant function database (0208) to achieve either (a) a firm quote (bid) (0209) on the RFQ, (b) multiple bids on the RFQ, or (c) no bids on the RFQ. This information is transferred back to the consumer (0201) who has the option of either accepting the firm quote bid(s) or rejecting the firm quote bid(s).

System Overview (0300)

A generalized system overview of the present invention is summarized in the illustration of FIG. 3 (0300) wherein the consumer (0301) interacts with a computer interface (0302) which communicates with a remote host computer system (0310) typically comprising the transaction arbiter (0311) and merchant function database (0312) both of which operate under the control of a computer server (0313) or other computer apparatus. The host computer system (0310) also interacts with one or more merchants (0320) as described previously to permit the merchant function database (0312) to be updated with merchant bidding functions.

Key to the advantages presented by the present invention is the ability of the merchant (0320) to deposit a FUNCTION (not just a static service/price or product/price pair) in the merchant function database (0312) which describes HOW the merchant will respond to bids placed by competing merchants in response to request-for-quotes (RFQs) presented by the consumer (0301) to the host computer system (0310). Traditional merchant sales interfaces limit the scope of merchant interaction to simply providing the consumer with the current price for the product/service specified in the RFQ. This prior art model fails to provide any basis for interaction between merchants, and thus limits the ability of merchants to dynamically adjust to changing market pricing conditions. Additionally, prior art fixed-price merchant systems prevent the consumer from obtaining the optimal price for a given product/service, since these prior art systems do not incorporate any knowledge cross pollination between competing merchants.

Arbitrated Brokering Method (0400)

This system may have incorporated an arbitrated brokering method as illustrated generally in FIG. 4 (0400) wherein the transaction arbiter operates with the following steps:

having the consumer generate a request-for-quote (RFQ) and communicate said RFQ to an arbiter (0401);

having said arbiter interrogate merchant functions that have been collected from a merchant pool and arbitrating the lowest current bid satisfying the RFQ (0402) (this step is often achieved by performing an unattended real-time price competition (bid) between the various merchants and arbitrating the lowest current bid satisfying the RFQ);

having said arbiter generate a firm bid and communicating said firm bid to said consumer (0403);

if consumer accepts said firm bid (0404), having said arbiter notify said merchant of said firm bid acceptance (0405); otherwise rejecting said firm bid and notifying said merchants of bid rejection.

One skilled in the art will recognize that these steps may in some circumstances be augmented, rearranged, omitted, and/or substituted, with no loss of function with respect to application in the field of the present invention.

Transaction Arbiter Method (0500)

The present invention may incorporate a transaction arbiter method as illustrated generally in FIG. 5 (0500) wherein the transaction arbiter operates with the following steps:

Extracting bid parameters from the consumer request-for-quote (RFQ) (0501). In this step any constraints placed on the bidding process by the consumer are extracted from the RFQ and prepared for presentation to a variety of merchant functions;

Initializing a merchant function database search index (0502);

Applying the extracted RFQ parameters to an indexed merchant function obtained from the merchant function database (0503);

Generating an indexed Bid Result from the indexed merchant function after applying the extracted RFQ parameters (0504);

Incrementing the merchant function database index (0505);

Determining if all merchant functions have been scanned, and if not, continuing to scan the remaining merchant functions (0506);

Sorting the Bid Results and merging these results with the consumer RFQ parameters (0507);

Determining if a stable set of Bid Results have been obtained, and if not, recycling the current set of consumer RFQ parameters (with merged Bid Results) into the Merchant Function database to determine a terminal set of Bid Results (0508). This step permits merchants the ability to rebid on a given RFQ based on the results of bids placed by other merchants;

Notifying the consumer of the terminal set of Bid Results and permitting the consumer the option of accepting or rejecting a firm bid offer from a given merchant (0509);

Notifying one or more merchant(s) of the consumer acceptance or rejection of their bid offer (0510). This feedback notification may in some circumstances permit the merchant the ability to reformulate their merchant function associated with the current bid parameters to enable their successful bidding in future RFQs posted by other consumers.

One skilled in the art will recognize that these steps may in some circumstances be augmented, rearranged, omitted, and/or substituted, with no loss of function with respect to application in the field of the present invention.

BRIEF DESCRIPTION OF THE DRAWINGS

For a fuller understanding of the advantages provided by the invention, reference should be made to the following detailed description together with the accompanying drawings wherein:

FIG. 16 illustrates an exemplary detail flowchart detailing an exemplary bidding process in response to a customer RFQ.

FIG. 20 illustrates exemplary screen shot diagrams generated by an exemplary embodiment of the present invention implementing a one-shot bidding function.

FIG. 21 illustrates exemplary screen shot diagrams generated by an exemplary embodiment of the present invention implementing a sequential bidding function.

FIG. 22 illustrates additional exemplary screen shot diagrams generated by an exemplary embodiment of the present invention implementing a sequential bidding function.

FIG. 23 illustrates an exemplary code fragment implementing one preferred brokering function method embodiment useful in some preferred embodiments of the present invention.

FIG. 24 illustrates an exemplary code fragment implementing an alternate preferred brokering function method embodiment useful in some preferred embodiments of the present invention.

FIG. 25 illustrates an exemplary code fragment implementing one preferred bidding function method embodiment useful in some preferred embodiments of the present invention.

FIG. 26 illustrates an exemplary code fragment implementing an alternate preferred bidding function method embodiment useful in some preferred embodiments of the present invention.

FIG. 27 illustrates an exemplary code fragment implementing a second alternate preferred bidding function method embodiment useful in some preferred embodiments of the present invention.

FIG. 28 illustrates an exemplary code fragment implementing a preferred minimum value bidding function method embodiment useful in some preferred embodiments of the present invention.

FIG. 29 illustrates an exemplary code fragment implementing one preferred embodiment of a price bid price percentage reduction function useful in some preferred embodiments of the present invention.

FIG. 30 illustrates an exemplary code fragment implementing one preferred embodiment of a price bid arbitration function useful in some preferred embodiments of the present invention.

FIG. 31 illustrates an exemplary flowchart implementing a preferred exemplary embodiment of the invention method as applied to an arbitrated brokering method.

FIG. 32 illustrates an exemplary code fragment implementing bid initialization functions useful in some preferred exemplary embodiments of the present invention.

DETAILED DESCRIPTION

Figure 1:
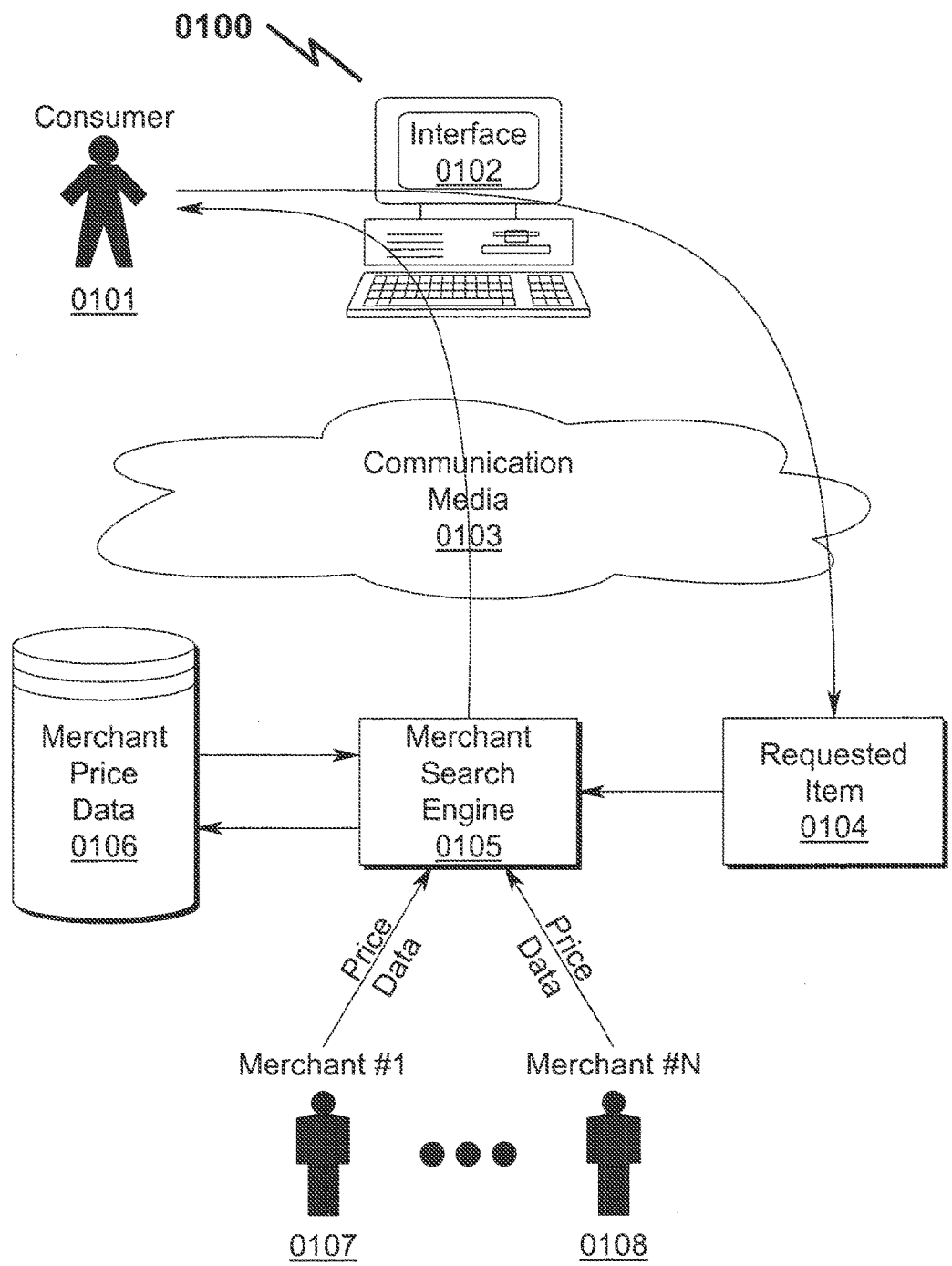
FIG. 1 illustrates a conventional prior art system incorporating price brokering over the Internet.
Figure 2:
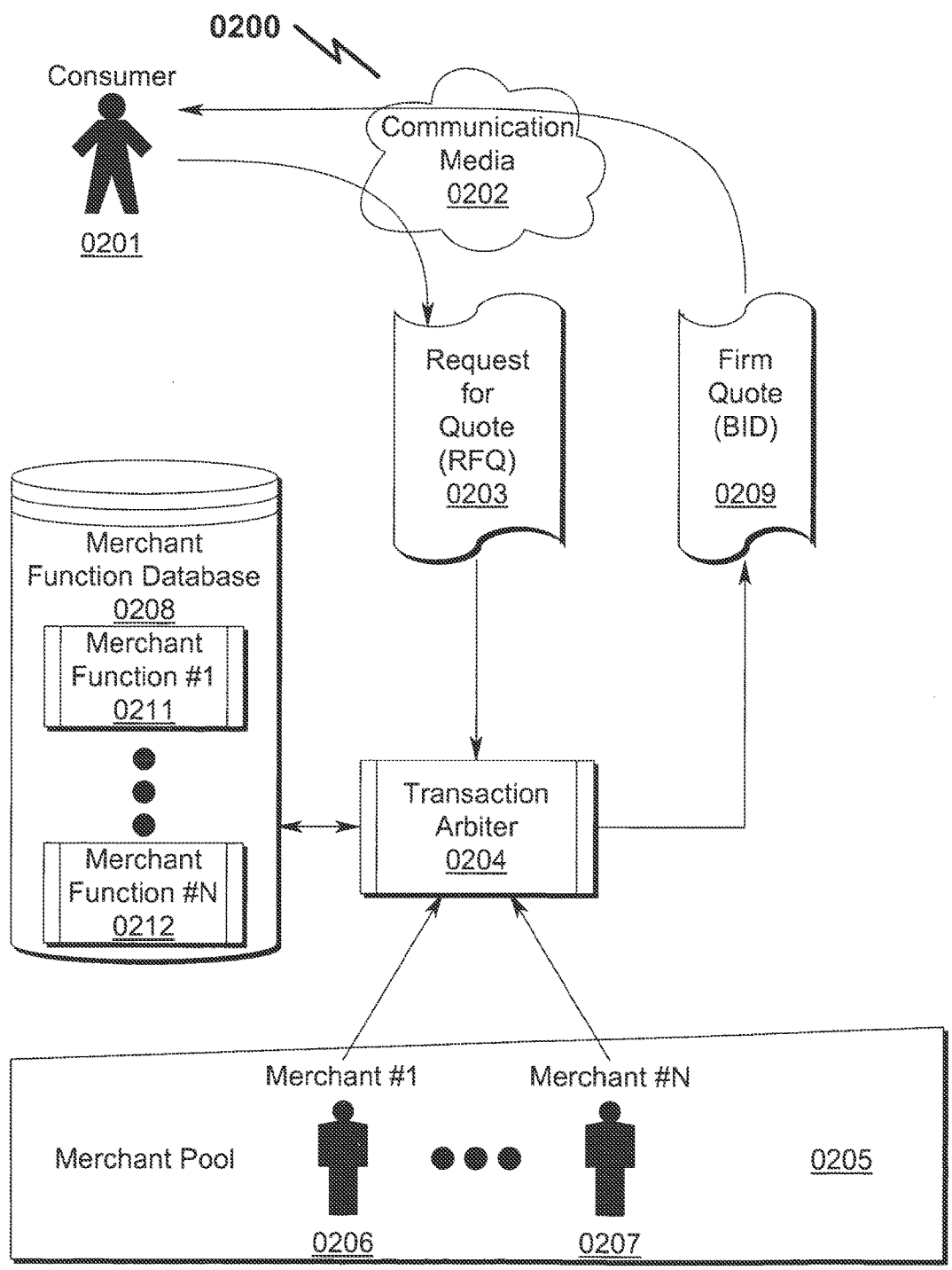
FIG. 2 illustrates a preferred exemplary embodiment of the present invention as applied to an arbitrated transaction brokering system.
Figure 3:
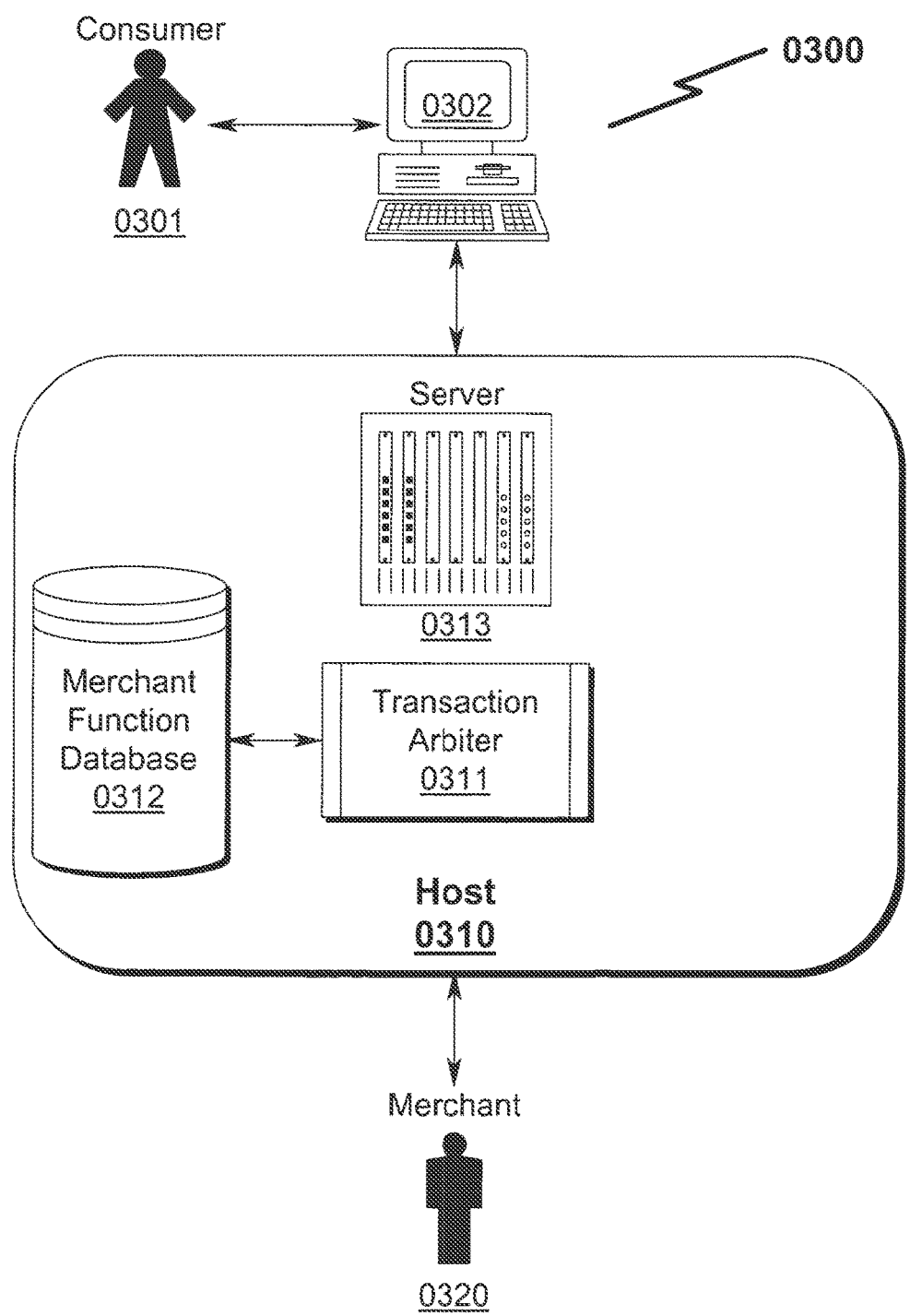
FIG. 3 illustrates an exemplary simplified system block diagram of the present invention.
Figure 4:
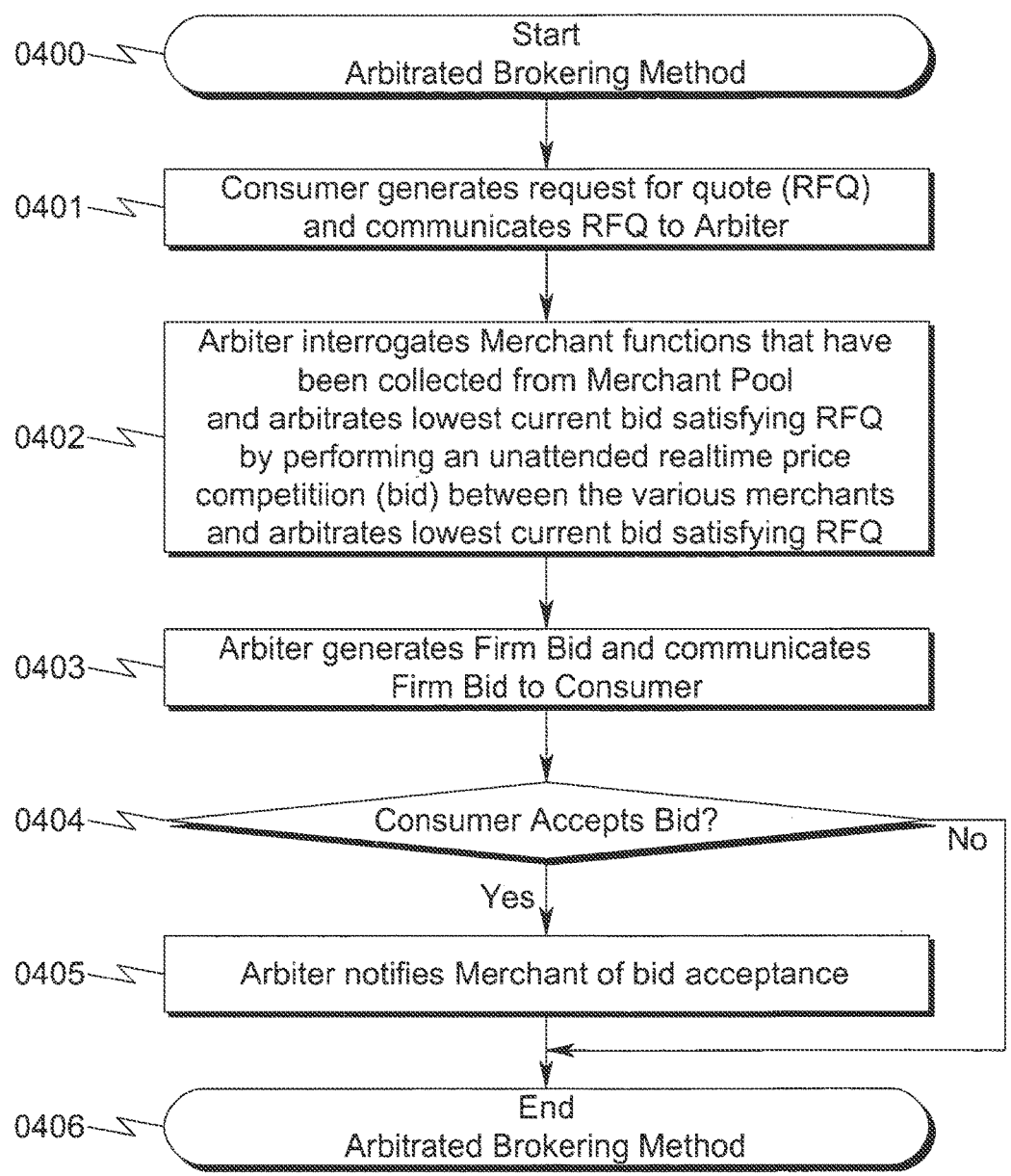
FIG. 4 illustrates an exemplary flowchart implementing a preferred exemplary embodiment of the invention method as applied to an arbitrated brokering method.
Figure 5:
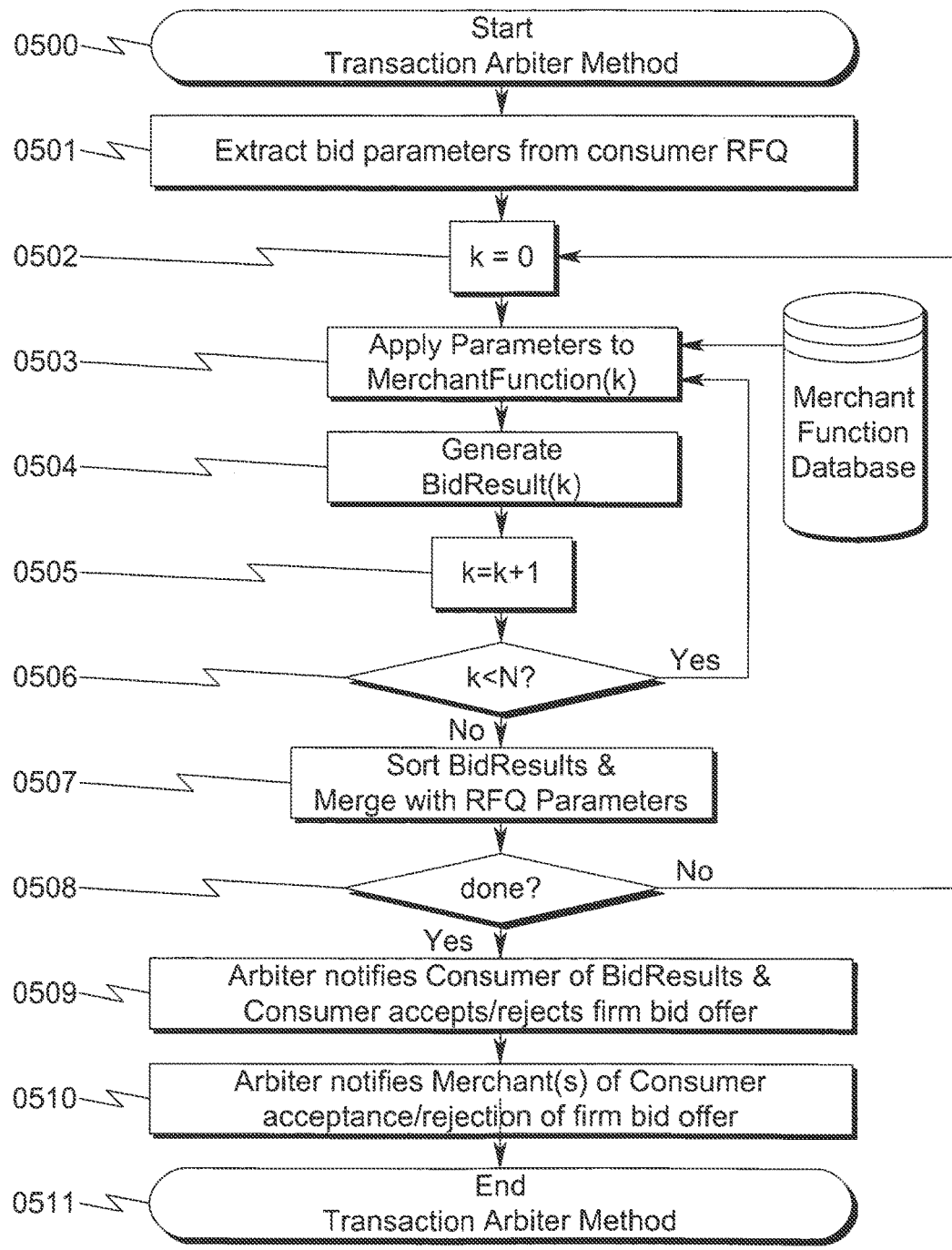
FIG. 5 illustrates an exemplary flowchart implementing a preferred exemplary embodiment of the invention method as applied to transaction arbiter method.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a TRANSACTION ARBITER SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Overview

The present invention describes the design of a large-scale retail shopping system making heavy use of the Universal Product Code (UPC) Structure and/or RFID's. The system is designed to manage, collect, connect, create, share, disseminate, compute, analyze, capture, record, store, move, retrieve and integrate information, data, functions, algorithms and applications as an individual tool and source for the consumer to find and conveniently shop for anything that is available for sale anywhere, and better yet, to obtain the best price possible, at a local market level, in real-time, traceable, portable and useable at the point of activity. The system is designed to produce a much more effective, flexible, reliable, satisfying and rewarding results than any of the existing shopping systems. This system is a comprehensive approach that allows consumers to take advantage of innovative technologies and devices that deliver new services and information. This solution is designed to allow the consumer to enhance their shopping experience in a variety of ways.

Contrast to Prior Art

Existing Search engine systems or price comparison web sites, index tens of millions of products involving tens of thousands of locations and a wide range of prices. They answer hundreds of thousands of queries every day. Despite the importance of search engines and electronic market systems on the web, very little research has been done on them to make them operational at the point of activity in real-time. Due to the rapid advance in technology and means for communication of data, creating a shopping system of this nature is very different now. The present invention provides an in-depth description of a large scale shopping system.

Apart from the problems of scaling traditional search techniques to data and information of this magnitude, there are new technical challenges involved with using the additional resources and means to produce better results. The present invention addresses the question of how to build a practical large-scale system, which can exploit the opportunities present in the retail market.

Introduction

The trade industry offers daily new challenges for consumers and retailers in shopping, marketing, competition, promotions, advertising, and sale techniques. People are likely to shop around until they obtain the best value for their money. At the present time this is achieved through physical cost comparison at different locations, through printed advertisements and promotions, coupons, radio and TV commercials, etc. In contrast, existing automated Internet based search engines offer a limited field for cost comparison and normally return low quality and unreliable "matches". Retailers on the other hand are constantly devising strategies to attract consumers in to their place of business, such as store loyalty cards, portable shopping systems, self-check outs, and the recent introduction of RFID readers, etc. While all of this is happening, the technology landscape is evolving rapidly to extend and enhance innovation and practicality to the point of business activity. Advanced data capture, mobile computing, wireless infrastructure, mobile systems software and global positioning systems are the new elements of this new landscape. This is a large-scale search and operating system which resolves all of the problems of existing systems and more. It makes especially heavy use of the Universal Product Code (UPC) structure and integrates all of the above mentioned technical elements to provide much better results.

Existing Price Comparison Internet Based Search Engines

Search engines of this type have come a long way from where they started a few years ago, to the point where they can make available to the consumer millions of product offers from thousands of locations around the U.S. They produce relevant search results by weighting price, popularity and availability of the products, against the reputations of the merchants that sell them. This is achieved from collected ratings from on-line buyers each month. These results, however, are relevant only to the fact that most if not all of the indexed merchants are out of reach through conventional methods and they rely on the delivery of their products on third party couriers. The reputation of a merchant, however, is sometimes compromised and/or affected by the performance of the courier. Another limitation is that these merchants and their ability to compare their prices only available through the Internet. Millions of consumers do not have access to the Internet or are inexperienced in web searching. Moreover, these web based search engines make extensive disclaimers on the reliability of their sources and the accuracy of their publications. The ratings of their merchants are informative only for those wishing to use them, but they do not guarantee any level of performance by an online merchant or other third party in any given transaction. The rating of their merchants are also subject to being manipulated or distorted and may undermine the integrity and accuracy of the merchant ratings.

Design Goals—Improved Cost Comparison Methods

With the present invention system, the collection of base prices is achieved through the use of participant merchant UPC databases, where their most current prices are stored and managed, any changes in their prices are instantly relayed to the present invention database. A second method of price collection is by capturing data at the point of activity by means of a hand held transceiver/scanner by consumers, relaying the price information of non-participant merchants to the present invention main database.

Contrary to the existing methods for price collection and rating information provided by online consumers, the information collected from the consumer is not incorporated in to the system until it is first analyzed and self-verified against the data provided by other consumers for the same product at the same location, avoiding manipulation or distortion which will undermine the integrity and accuracy of the prices. Moreover, the information provided by each of the consumers is traceable as each consumer once registered is assigned an identification code, a personalized transceiver/scanner and a membership card. Consumers receive an incentive for their participation on capturing and transmitting price information to the system database. As they obtain and accumulate credits for each price transaction, these credits are applied towards discounts on their purchases and are generated in the form of electronic coupons issued by manufacturers. On the other hand, someone who would provide erroneous information intentionally is subject to be denied future participation.

Real-Time Performance

Some of the existing web based cost comparison search systems claim that their transactions are actually performed in real-time. By this they mean that they use the latest price available in their database, this only allows the consumers to evaluate what is available at that particular moment not knowing if the price was updated a minute ago or a month ago or if it has been updated at all.

With the present invention system, there is a new meaning for the term "real-time", where lowest prices are calculated in the precise moment requested by the consumer, not only initially providing the basic price for each product from each merchant in any selected area, but actually competing through a systematic bid process for the lowest price.

Bids are accomplished through the transaction arbiter. This transaction arbiter can be customized to vary the price of each of their products depending on various given parameters such as the day of the week, the time of the day, a percentage discount, maximum and minimum limits, lowest price of all, a percentage under the lowest price, or many other combinations, all in relation to the merchant's own prices or the prices of their competitors.

System Features

Search by Product Category

The present invention capabilities are Universal, just like the product code structure. It can be applied and configured to operate with any kind of products bearing the Universal Product Code print or label, or alternatively, just by a product description or model number. A selection of product category is an option on the main menu of the web page and the transceiver/scanner, this means that the main feature of the system, price biding, can be used at any level of the retail industry, mainly groceries (ALBERTSON vs. KROGER vs. TOM THUMB vs. WALMART, etc.), home improvement products (LOWE'S vs. HOME DEPOT vs. ELLIOT'S vs. TRUE VALUE etc.), auto parts (AUTO ZONE vs. O'REILLEY etc.), Office products (OFFICE DEPOT vs. OFFICE MAX etc.) Wholesale Clubs (SAM'S CLUB vs. COSTCO etc.), Pharmacies (ECKERD vs. WALGREEN'S etc.), and the list could go on and on with department stores, book stores, tire stores, music stores, etc.

Additions can be made to the Universal Product Code structure for service establishments such as oil change, brake service, engine tune-up, haircuts, laundry services, etc.

Searches by Area

This feature allows the consumer to conduct the search by several options. Whether the consumers prefer to search by distance to their house or place of work, by radius in mileage increments, in route to and from work or home, the nearest location, the lowest priced, the nearest open location, the location that has the product in stock etc., all of the above and many others or any combinations are possible with the present invention mapping and global positioning system capabilities.

Best Price Calculation Options

All lowest price algorithmic calculations are initiated by first displaying the various merchants base prices without any discounts. A limit can be set up to display two or more merchants at a time. The first selection of merchants can be initiated by proximity or other basic preferences. Once these few merchants are selected and their basic prices are displayed, the consumer will then initiate the bid process and the lowest price result is obtained within a few seconds based on the algorithmic configuration of each individual merchant. The bidding process does not need to be attended by the participating merchants.

Lowest prices can be calculated for each individual product or for the sum of the price of all products.

By Time of Day

This is one of the features that allow the consumer to find the best price for the product or products being searched. Merchants have the option to adjust their prices automatically by applying certain parameters in the algorithm. Some merchants will be interested in attracting consumers to their locations at times of day when sales are normally slow, for example a grocery store that is normally open 24 hours will like to reduce their prices an additional 5% after 10 pm or 7% after midnight, that feature will play a decisive role for a consumer to determine if he or she goes to the nearest store which does not offer a discount based on the time of the day or the one that is a little farther but offers a discount during certain time of the day.

By Day of the Week

A similar approach to the above is implemented based on the day of the week, as merchants can reduce their prices on the days of the week when sales are slower.

By Percentage Under First Immediate Lowest Price

With this feature, a merchant can set up its individual algorithmic configuration to go under any reasonable competitor's lowest price and beat it by a certain percentage in order to gain the business of the consumer, a merchant can decide to implement this option on the as needed basis depending on the supply and demand of the products or competitiveness and aggressiveness of other merchants, at the present time many merchants offer a lowest price guarantee promising to the consumer to match or beat any competitors price. However, many times this is so difficult to achieve as consumers would have to go shopping to many locations in order to determine who has the best price. A merchant can also implement this feature as an option to self-guarantee that it has the lowest prices in the area without having to physically compare prices or published promotions or sale specials.

By Maximums or Minimums

This feature allows merchants to set up their prices to be lower than the competition up to a certain maximum discount or minimum price. With this feature merchants will be safe of not over cutting their prices for a loss.

Other Features

As mentioned before the present invention utilizes three main channels of operation and communication: the Internet and/or two different transceiver/scanners, one mobile and one stationary. All of the above features can be executed through any of these three with the exception of the global positioning system (GPS) feature available on the mobile transceiver/scanner only, the option to select either is at the consumer's discretion depending on accessibility, and affordability, etc.

The way the system takes advantage of the global positioning system technology is for the consumers to be able to locate merchants in relation to their mobility or location at any given time during the day. Whether it is on their way to or from work or school or an area unfamiliar to them, consumers will be able to transmit their present real-time location to the database for determining the optimal choice of merchants in that area for an added convenience of shopping at remote locations not necessarily close to their neighborhood but with a merchant offering even better prices. It is well known in the retail industry that merchants base their prices merely on the economy and income of families in the immediate area to their locations, some times doubling or tripling their profits based on this factor alone, so many consumers will prefer to purchase their products at the lowest priced location not necessarily being close to their home or up class neighborhood but instead close or in their route to or from work or school or a friend's or relative's home.

Custom Shopping List

Each consumer is able to set up and store his or her custom prepared shopping list, one that includes favorite products normally and repeatedly purchased. This favorite list is easily edited to add or delete certain products each shopping time using check all option, check individual items option, uncheck all option, etc.

Money Saved Feature

Each actual final purchase transaction can automatically be saved on the transceiver as to keep a record and sum of the total savings. This feature also helps to evaluate the overall results and advantages of each consumer purchasing practices.

Analysis of Purchasing Patterns and Advertisement Targeting

This feature serves to store information on products normally purchased by the consumer. This information can be submitted to the present invention database on an optional basis to assist manufacturers in targeting their products and aiming brief graphic and voice advertisements and greetings to the consumer via the transceiver/scanner display and to receive electronic coupons for additional discount directly from the manufacturer. This process will replace the existing method for consumers to mail their receipt and hardcopy UPC, and eliminate the need to wait up to three months or more to get their mail-in rebate.

Two Way Retrieval/Transfer of Data via Transceiver/Scanner or Website

The main function of the transceiver and website is to retrieve and transfer information to and from the present invention database. Each time that the send/receive button is pressed an automatic sequence of downloads and updates is initiated, this process is also self-activated each time the system is less loaded facilitating and speeding up the process. The consumer transmits or transfers data captured through the scanner, also information on purchasing patterns, global position coordinates and other information. Simultaneously it retrieves from the present invention database any pertinent and applicable information and data to enable the consumer to perform shopping activities also automatic downloads are performed on customized greetings and graphic and voice adds.

Bid Confirmation/Verification

Each time a bid process is completed on the purchase of a product or products a confirmation/verification code is assigned for the transaction, the approval code can be retrieved at the point of sale by merchants at the time of check out with the use of the customer's membership card, the same way a credit card transaction is processed and approved via a credit card modem.

Product Price History/Antitrust Policing

With this feature, consumers can retrieve historical data of any product such as lowest or highest price ever sold, Merchant's records of sales and prices, time each merchant has been a participant, which merchants are not participant, etc.

Anticompetitive collusion, Price Fixing, Bid Rigging and Market Allocation Schemes can also be closely Monitored and policed with this feature.

System's Suggested Retail Price

Based on retail market statistics at any determined time, supply and demand, profit margins and other relevant factors, the system can set up a fair market value for each product, as a suggested retail price for merchants to match, cut, or follow closely if desired.

Identification of Comparable Products

This feature allows the identification of similar products to the ones being searched. It promotes competition among similar retailers which their strategy is to sell different brands than competitors but the products are almost identical, as to avoid an easy price comparison.

Storage and Retrieval of Merchant and Manufacturer History

With this feature historic data related to company's finances, number of bids won, price history and the like can be exchanged.

System Architecture Overview

Following an overall discussion of the present invention architecture:

Network—The network is based on a communication exchange Architecture that provides high speed networking and communication systems that can move volumes of product data in real-time.

Wireless PSA's—This feature uses hand held PSA's that are capable of running network related applications and are equipped with additional integrated hardware, such as a cell phone, a reading barcode scanner or radio frequency identification applications, and a global positioning system.

Wired PSA's—This feature uses wired countertop telephones that are also capable of running network related applications and are equipped with additional integrated hardware such as, a reading barcode scanner or radio frequency identification applications, an LCD, and a printer.

Servers—Are used to crunch and analyze the data in real-time. The various servers among other functions compress and store each of the Merchants information and their multiple lists of products in to a repository.

Application—The application glues the components of this system together. It plays a key role as the main mediating unit for the integration of data, it is positioned between data sources and output formats in the form of a data repository. The software serves as the main technological interface for the exchange and delivery of information.

The technical aspects of the application include:

Flexibility of Data Formats and Protocols—The application runs on a server and provides for the connection between various data sources and output formats. Consumer inquiries can be of any protocol, processed with the corresponding connector.

Virtual Repository of Information—The application functions like a large index database, through which requested content is "found" in its corresponding data source.

The present invention data structures are optimized so that a large file can be accessed and searched efficiently.

Summary

The system is designed to be a scalable search engine. The primary goal is to provide high quality low price search results over a rapidly growing and improved retail market. The system employs a number of techniques that make it unique in pricing options and quality. Furthermore, the system is a complete architecture for gathering and disseminating information. In addition to being a high quality search engine, the system is a search tool necessary for a wide range of applications.

Data Flow (0600, 0700, 0800)

Figure 6:
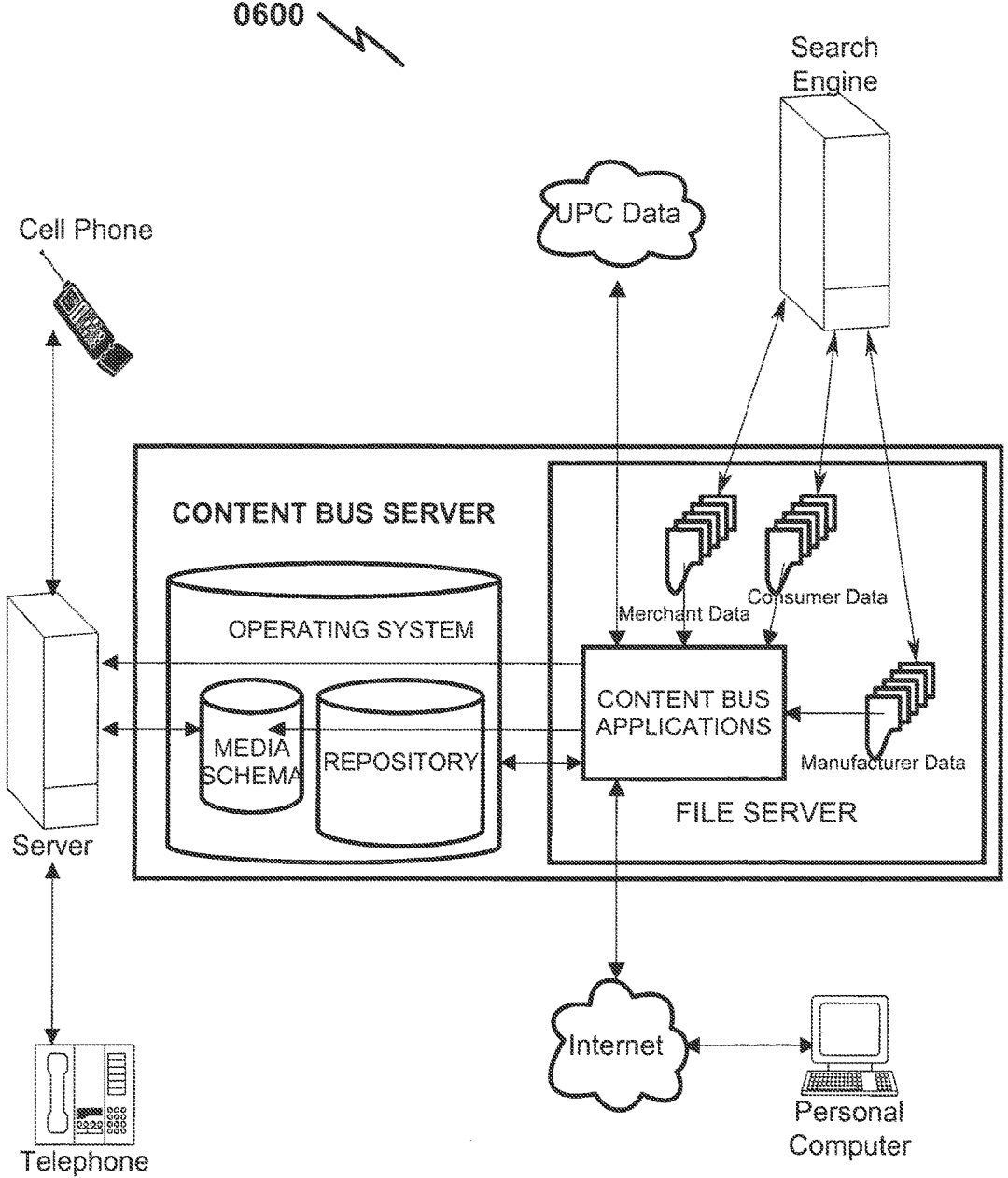
FIG. 6 illustrates an exemplary data flow diagram associated with a presently preferred embodiment of the present invention.
Figure 7:
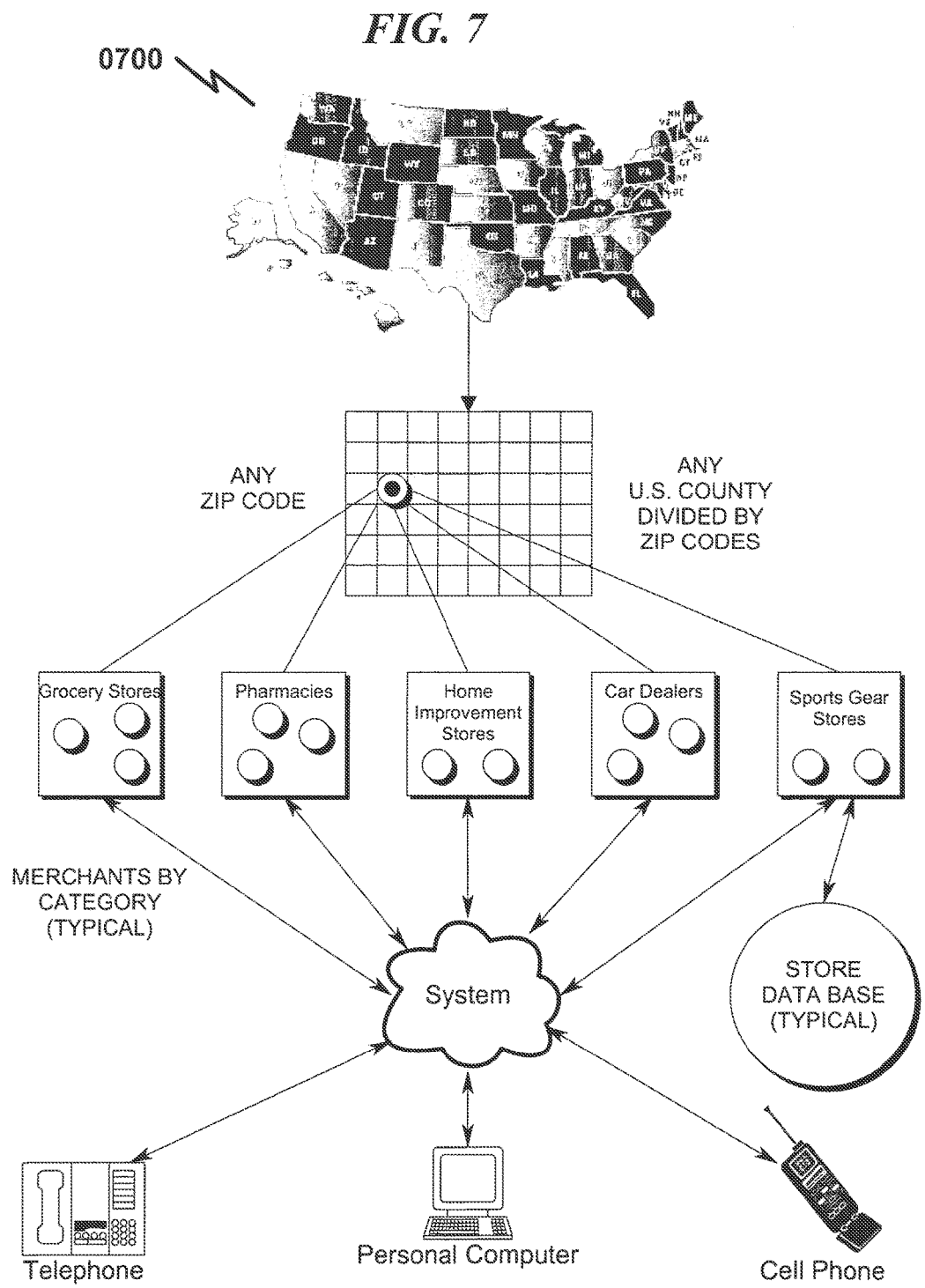
FIG. 7 illustrates an exemplary data flow diagram associated with a presently preferred embodiment of the present invention.
Figure 8:
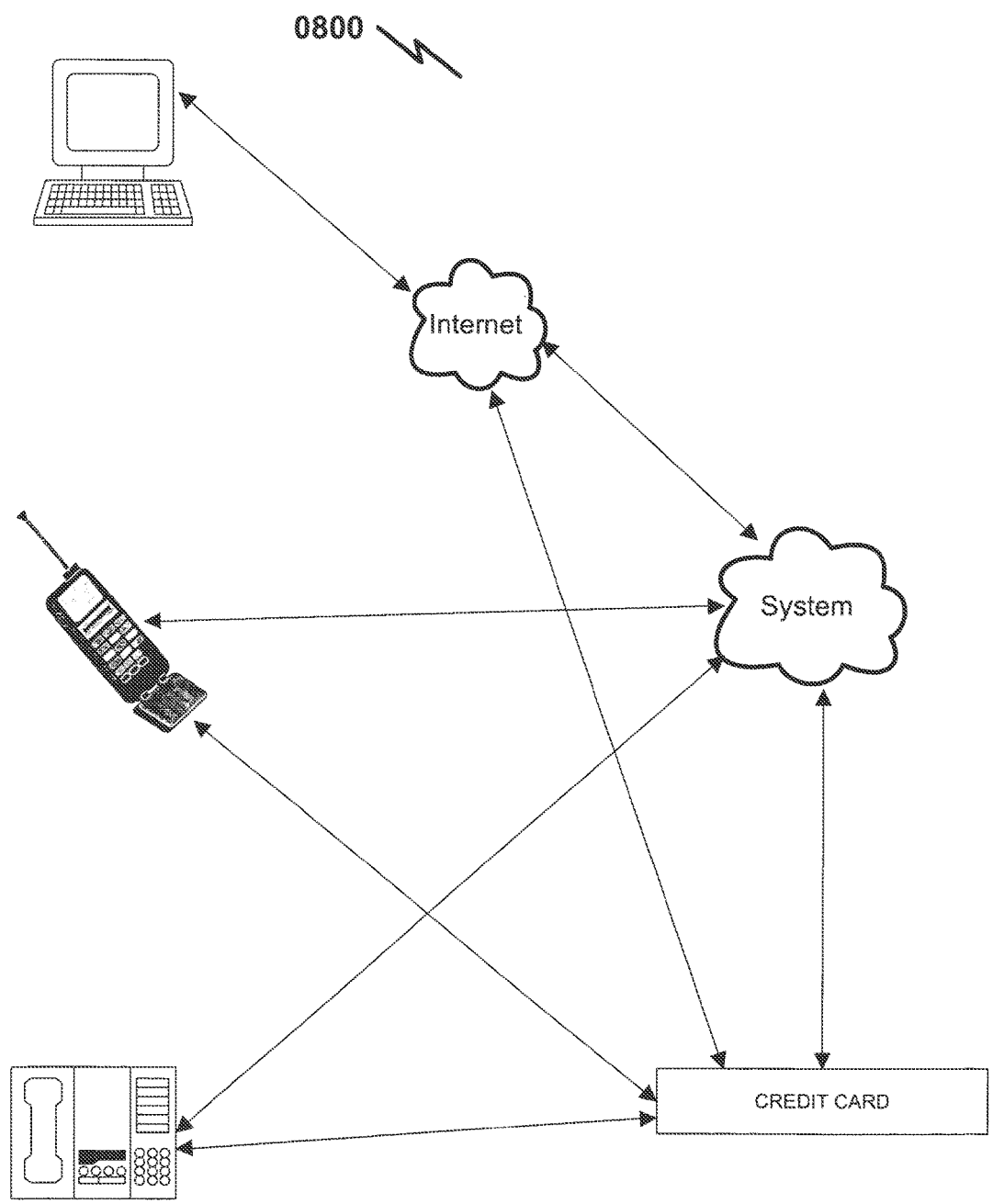
FIG. 8 illustrates an exemplary data flow diagram associated with a presently preferred embodiment of the present invention.

The data flow associated with the present invention is generally illustrated in FIG. 6 (0600), FIG. 7 (0700), and FIG. 8 (0800). Within this context, Individual Systems can be assigned to cities as illustrated in FIG. 6 (0600).

Referencing FIG. 7 (0700), Individual Zip Code maps are then segregated into different merchant categories maps. These can be (for example) grocery Stores, Home Improvement Stores, Auto Part Stores, Office Product Stores, Wholesale Clubs, Pharmacies, Department Stores, Book Stores, Tire Stores, Music Stores, etc.

Each Zip Code map along with each individual store data, is linked and forms an integral part of the system for the exchange of data.

Each individual store maintains its individual database and shares it with the transaction arbiter system.

Remote Transceivers such as a Cell Phone and a Home phone are used to exchange information and data with the system. The main function of the transceivers is to retrieve, transfer and display information to and from the system. Each time that the send/receive button is pressed an automatic sequence of downloads and updates are initiated, this process is also self-activated during low usage hours. The consumer transmits or transfers data captured through the scanner, also information on purchasing patterns, global positioning coordinates and other information. Simultaneously it retrieves from the present invention database any pertinent and applicable information and data to enable the consumer to perform shopping activities also automatic downloads are performed on customized greetings and graphic or voice commercial adds.

The transaction arbiter system is also accessible thru the Internet by means of a Personal Computer.

Referencing FIG. 8 (0800), each shopping transaction is automatically linked to a credit card or membership card database, the relevant information as well as a transaction confirmation number can be retrieved via the transceiver or via a credit card reader at any merchant location. Payment options can also be selected and executed this technique.

Transaction and payment information is exchanged between credit/membership card database and the system. With this feature all shopping transactions can be prepaid and then verified at any merchant location.

Overall Scope (0900)

Figure 9:
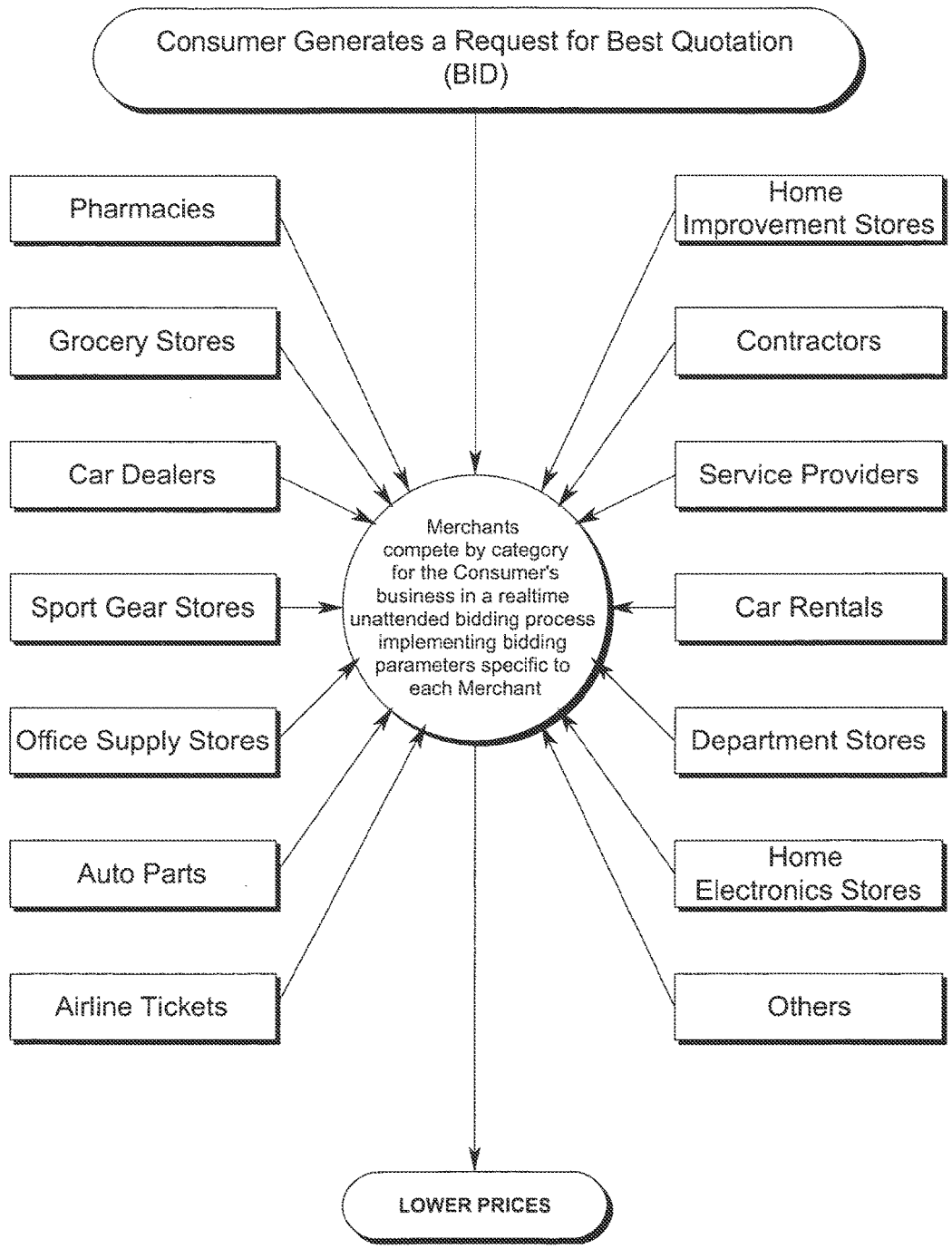
FIG. 9 illustrates an exemplary information flow diagram illustrating how the present invention interacts with customer RFQs to produce lower purchase prices.

The present invention is represented in FIG. 9 (0900) where the overall scope is generally depicted, in particular, how the consumer will benefit from free and open competition among merchants resulting in lower prices. This is achieved through a systematic real-time unattended process that permits consumers to interact with merchants over a communication network and obtain brokered deals for services or merchandise by means of bidding functions selected and customized by each specific merchant and present the optimal possible bid to a request-for-quote generated by the consumer. The customized parameters are only known to each specific merchant and the transaction arbiter and cannot be viewed by other merchants as to promote fair competition.

Consumer Data and Parameters (1000)

Figure 10:
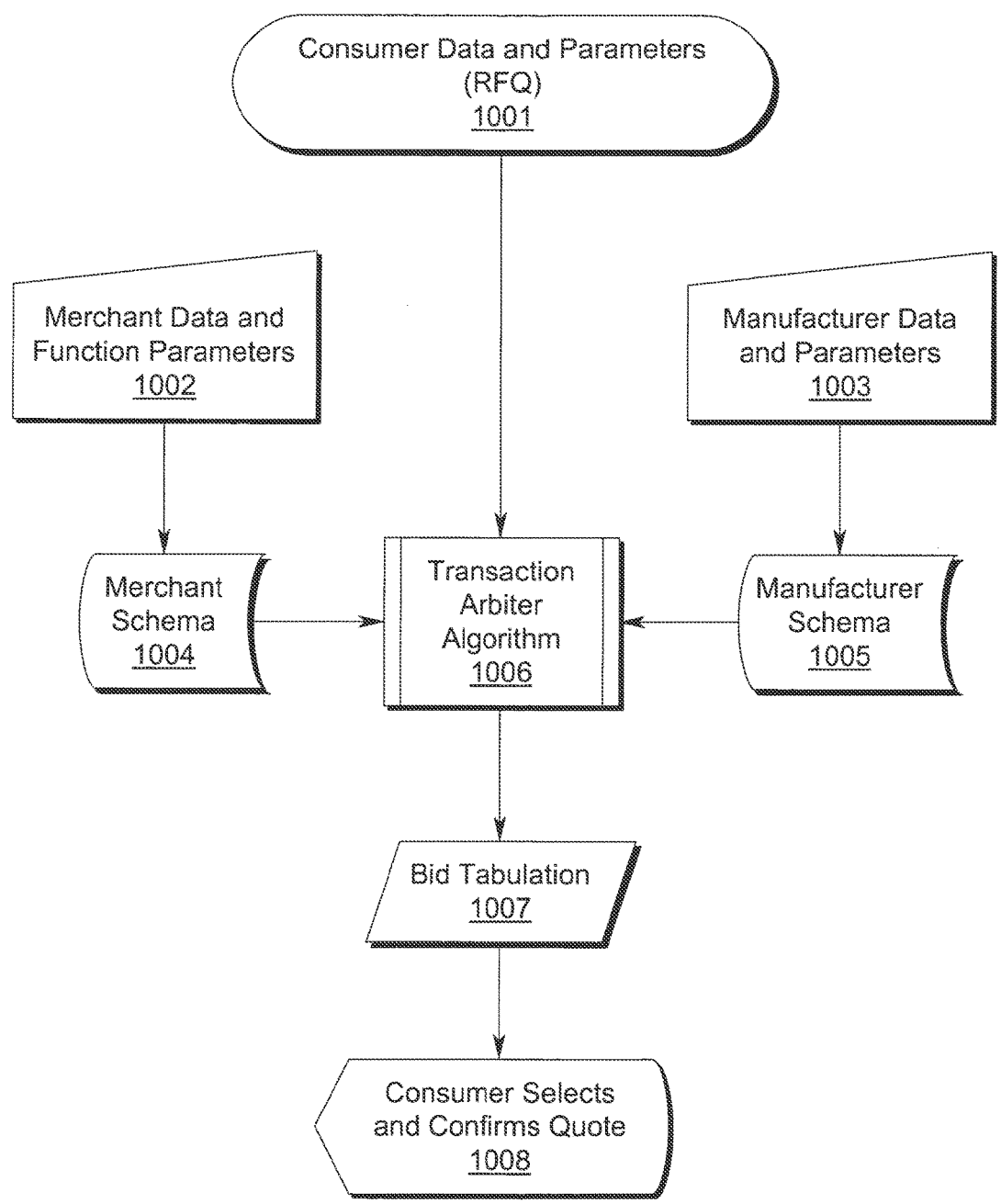
FIG. 10 illustrates an exemplary system diagram illustrating how the present invention interacts with consumer RFQs, merchant data, and manufacturer data.
Figure 11:
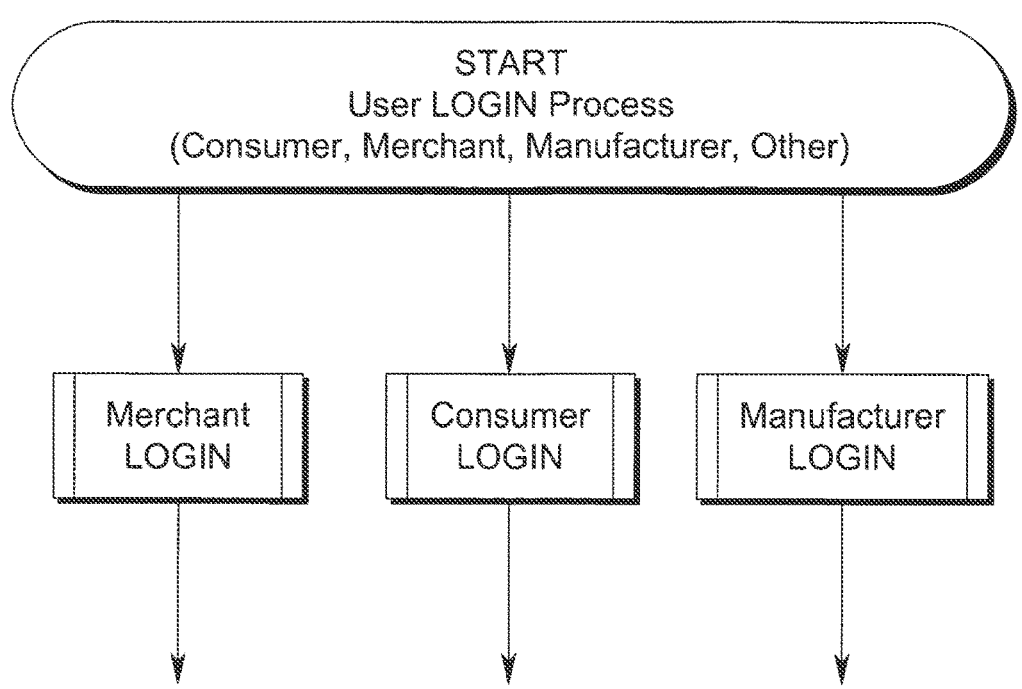
FIG. 11 illustrates an exemplary flowchart useful in some implementations of the present invention illustrating user login procedures for merchant, consumer, and manufacturers.

FIG. 10 (1000) illustrates the basic means for interaction between consumer and merchants and provides a source for the consumer to input parameters and data specific to each product for which a quote is being requested. This process is further described in FIG. 12 (1200).

Item (1002) represents the source for participating merchants to input their specific parameters and data relative to their field and products being offered. This process is better described in FIG. 13 (1300).

Item (1003) represents the source for participating manufacturers to input their specific parameters and data relative to their field and products being offered. This process is better described in FIG. 14 (1400).

Item (1004) represents a file server where information, data and history relative to participating merchants is stored, linked and synchronized to other functions, such as product database, location, number of bids won, schedules, average product price, lowest product price, financial statistics, and many others. All of this information can be accessed by consumers during a request for quotation.

Item (1005) represents a file server where information, data and history relative to participating manufacturers is stored, linked and synchronized to other functions, such as product database, electronic coupon scheme, average product price, lowest product price, financial statistics and many others. All of this information can be accessed by consumers during a request for quotation.

Item (1006) the algorithmic functions of the transaction arbiter are described in detail in FIGS. 15-32.

Item (1007) bid tabulation, displays the collection of bid results reflecting the lowest prices being offered by the various participating merchants for the consumer to select and confirm (1008).

Consumer Login (1200)

Figure 12:
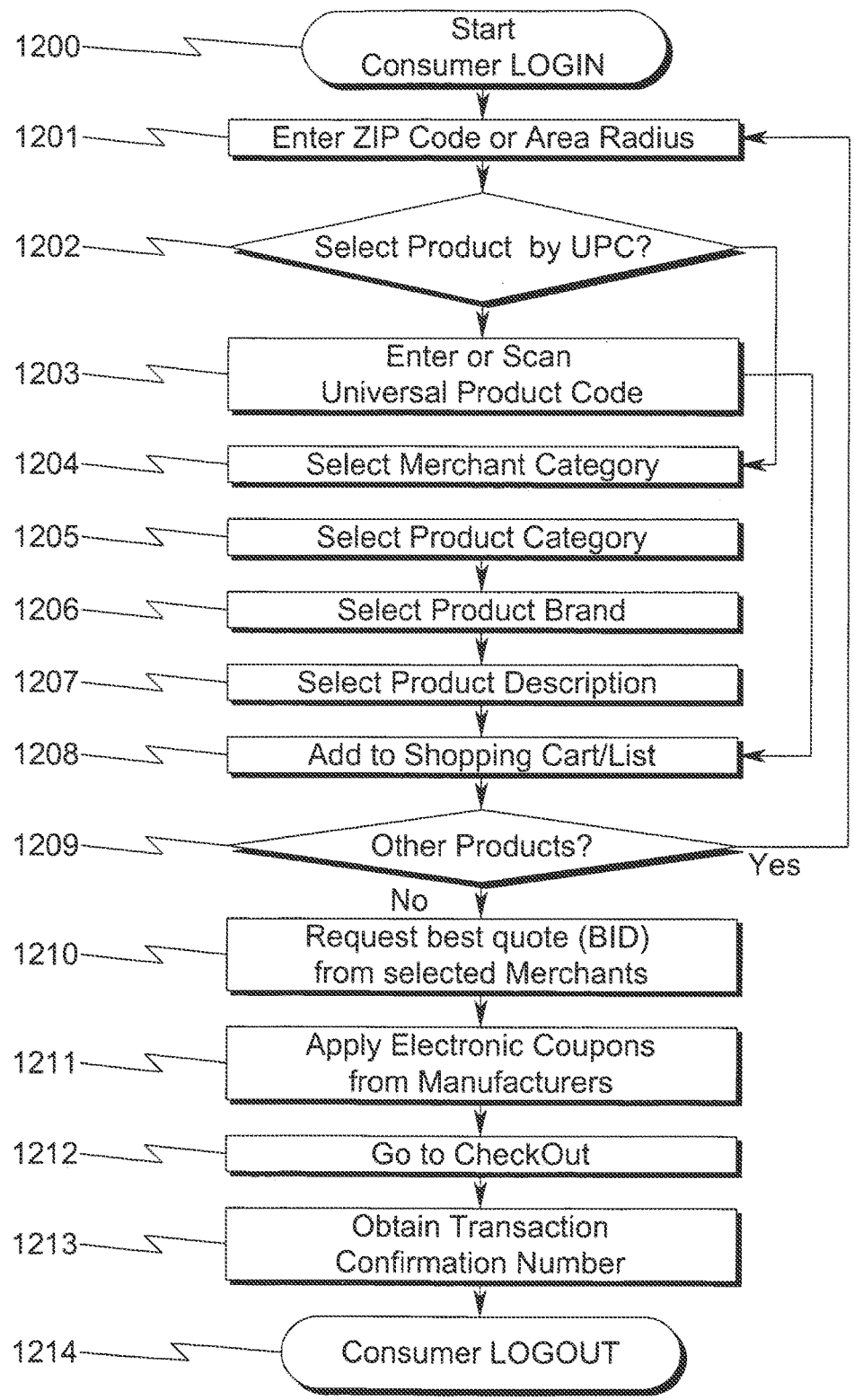
FIG. 12 illustrates an exemplary detail flowchart useful in some implementations of the present invention illustrating user login/process procedures for consumers.

FIG. 12 (1200) represents the flow of steps to be followed by a consumer from beginning to end during any given transaction in a request-for-quote. Depending on the method used to access the system, FIG. 12 could be representative of a web site, a display screen on a communication device, or any other method where (1200) will be a block where an ID or password are to be logged in to gain initial access in to the system.

Item (1201) gives the consumer the ability to select an area where the search is going to be conducted, which can be limited to a specific zip code or codes, an area radius, a remote location, GPS coordinates, etc. Once this choice is made, the consumer is to input the description of the product being priced (1202), by following steps (1205, 1206, 1207) or in the case that the consumer is using a scanning enabled device such as a cell phone with UPC scanner, then the data on a specific product can be directly captured and relayed to the system (1203). This process is to be repeated for each of the products (1209) being priced and the final choices are to be transferred on to a shopping cart/list (1208). With each of these steps, the extent of the search in the present invention database is being narrowed considerably facilitating the bidding transaction.

Once the above steps are completed, the bid process is initiated (1210). It is at this time when parameters previously customized by each merchant are put in to action.

During steps (1205, 1206) flags can be displayed on the products to which manufacturers have previously linked a particular discount, rebate or electronic coupon, this feature will play a decisive role for a consumer in the selection of a product, specially if an additional discount is being offered by the manufacturer. These electronic coupons can be applied towards the winning bid from a merchant for an even lower price (1211).

Once the final price on the product or products has been obtained, the next step is to proceed to the checkout (1212) where the consumer can prepay for the products being purchased and obtain a transaction confirmation number to be presented at the merchant's location for collection of the articles purchased (1213).

Figure 13:
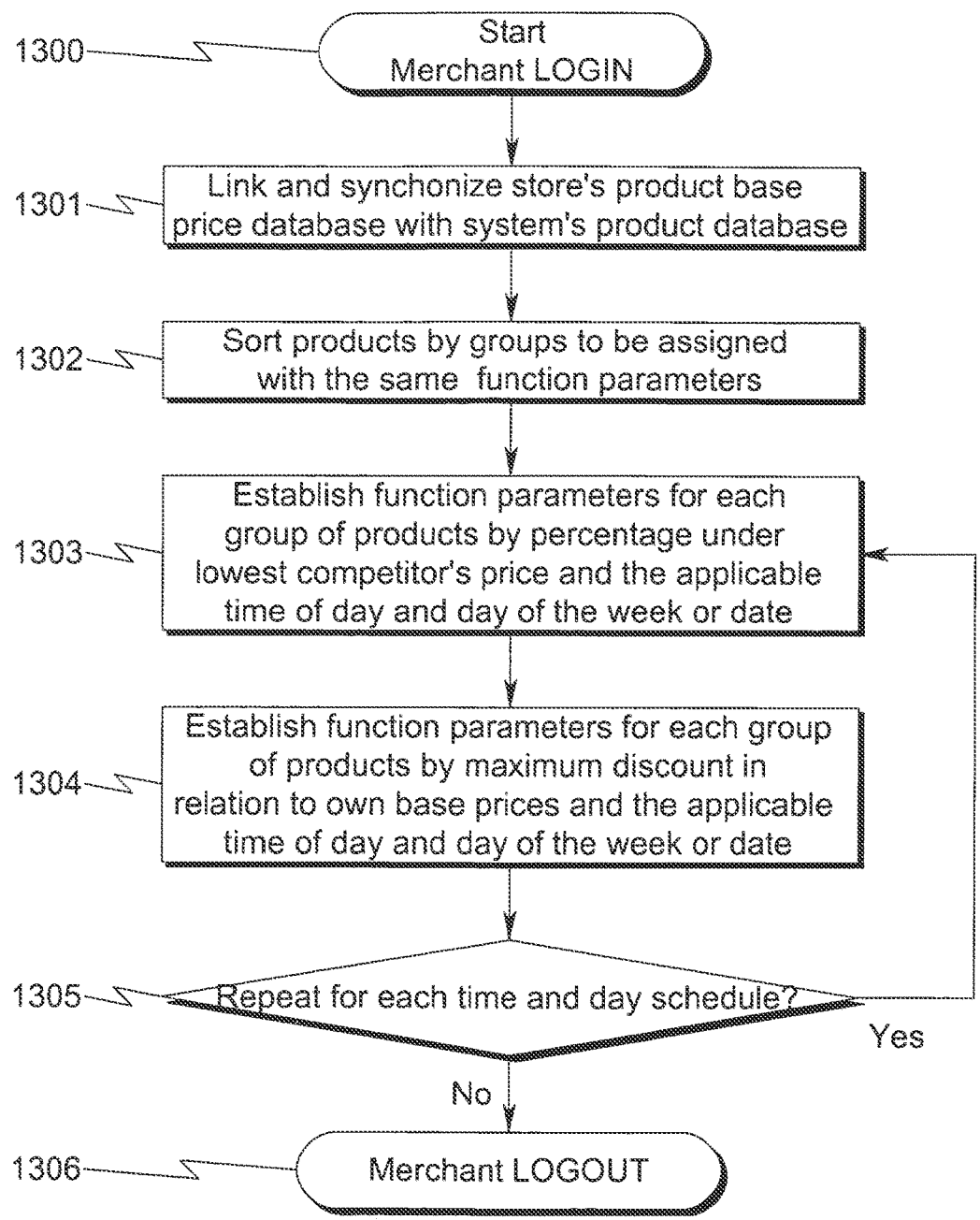
FIG. 13 illustrates an exemplary detail flowchart useful in some implementations of the present invention illustrating merchant login/process procedures.

FIG. 13 (1300) represents the steps to be followed by a participating merchant on the maintenance and updating of their schema and/or parameters where after logging in (1300) they can proceed to link and synchronize their product base price database with the present invention product database (1301), each merchant location, maintains, stores and updates their individual database to minimize the size of the present invention data storage capacity. The present invention server will connect to the merchant's server once a consumer has selected the merchant. Once the product databases have been linked and synchronized, the various products are sorted in to individual groups to which the same function parameters are to be applied (1302). It is anticipated that merchants will prefer to designate specific parameters to a large group of products instead of designating specific parameters to each and every of their hundreds or thousands of products.

Two of the main parameters to be applied by merchants to each group of products are (1303) a percentage number, in increments of 1%, to undercut the lowest competitor's price from the group of merchants selected by the consumer, and (1304) the maximum cut to be applied to a product in relation to the merchant's own base price as to avoid the price being over cut for a loss in the event that the competitor's price is too low. The application of these two main parameters can be customized at different schedules by time and day of the week (1305). Also refer to FIGS. 15 and 16.

Figure 14:
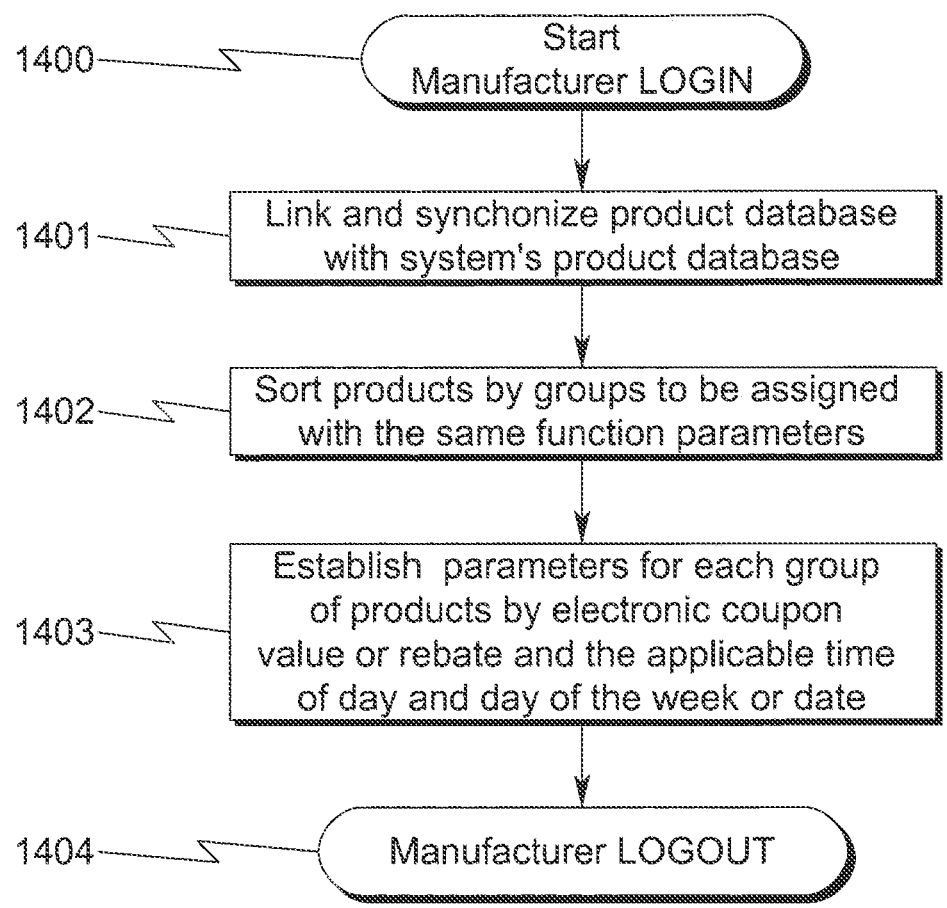
FIG. 14 illustrates an exemplary detail flowchart useful in some implementations of the present invention illustrating manufacturer login/process procedures.

FIG. 14 (1400) is representative of the steps to be followed by a participating manufacturer on the maintenance and updating of their schema and/or parameters where after logging in (1400) they can proceed to link and synchronize their product database with the present invention product database (1401), each manufacturer, maintains and updates their individual parameters which can be synchronized with the present invention database at predetermined intervals or each time a change has been made. Once the product databases have been linked and synchronized, the various products are sorted in to individual groups to which the same function parameters are to be applied (1402). It is anticipated that manufacturers will prefer to designate specific parameters to a group of products instead of designating specific parameters to each and every of their products. The application of these parameters can be customized at different schedules by time and day of the week (1403).

Figure 15:
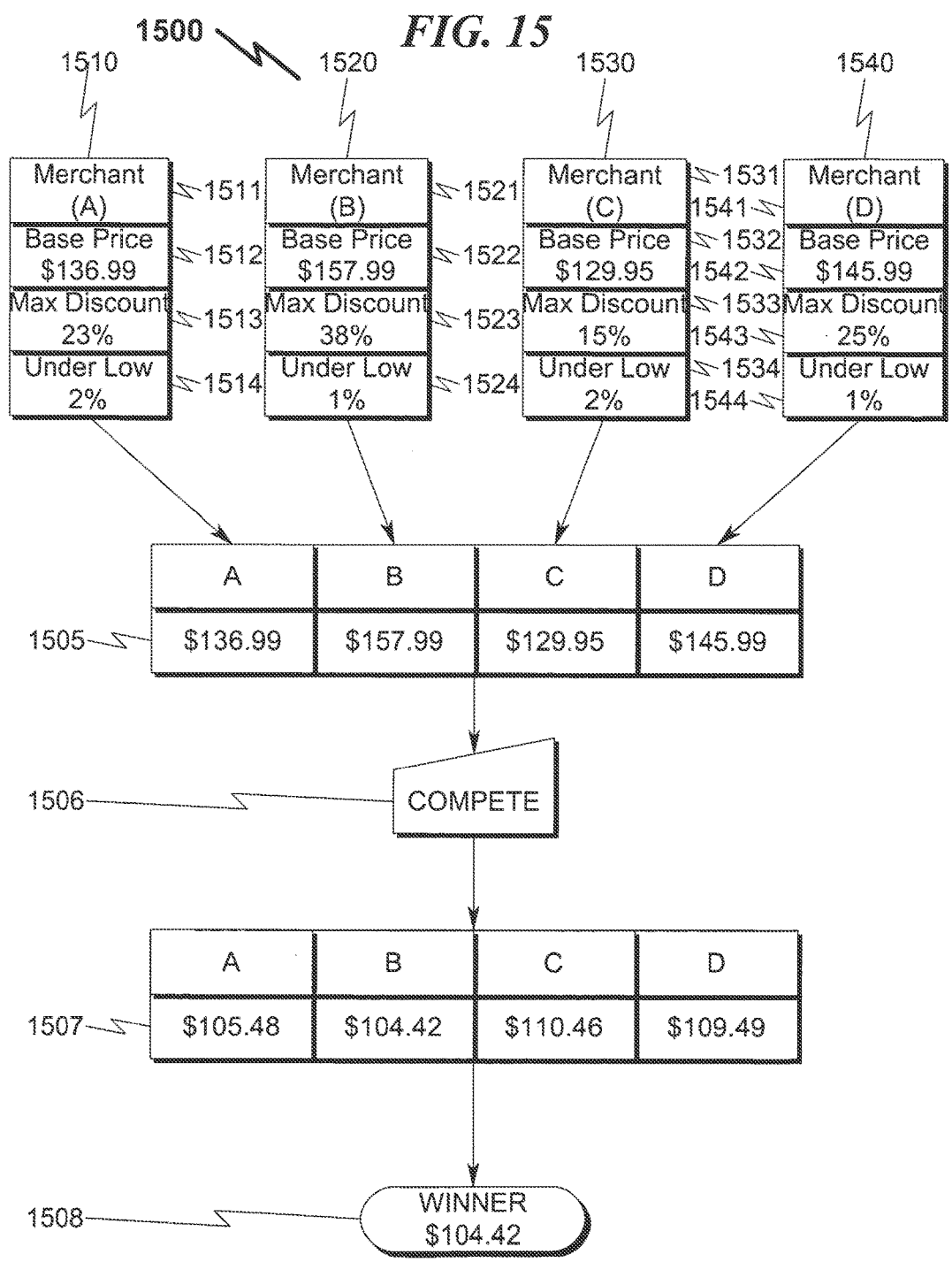
FIG. 15 illustrates an exemplary overview flowchart detailing an exemplary bidding process in response to a customer RFQ.
Figure 17:
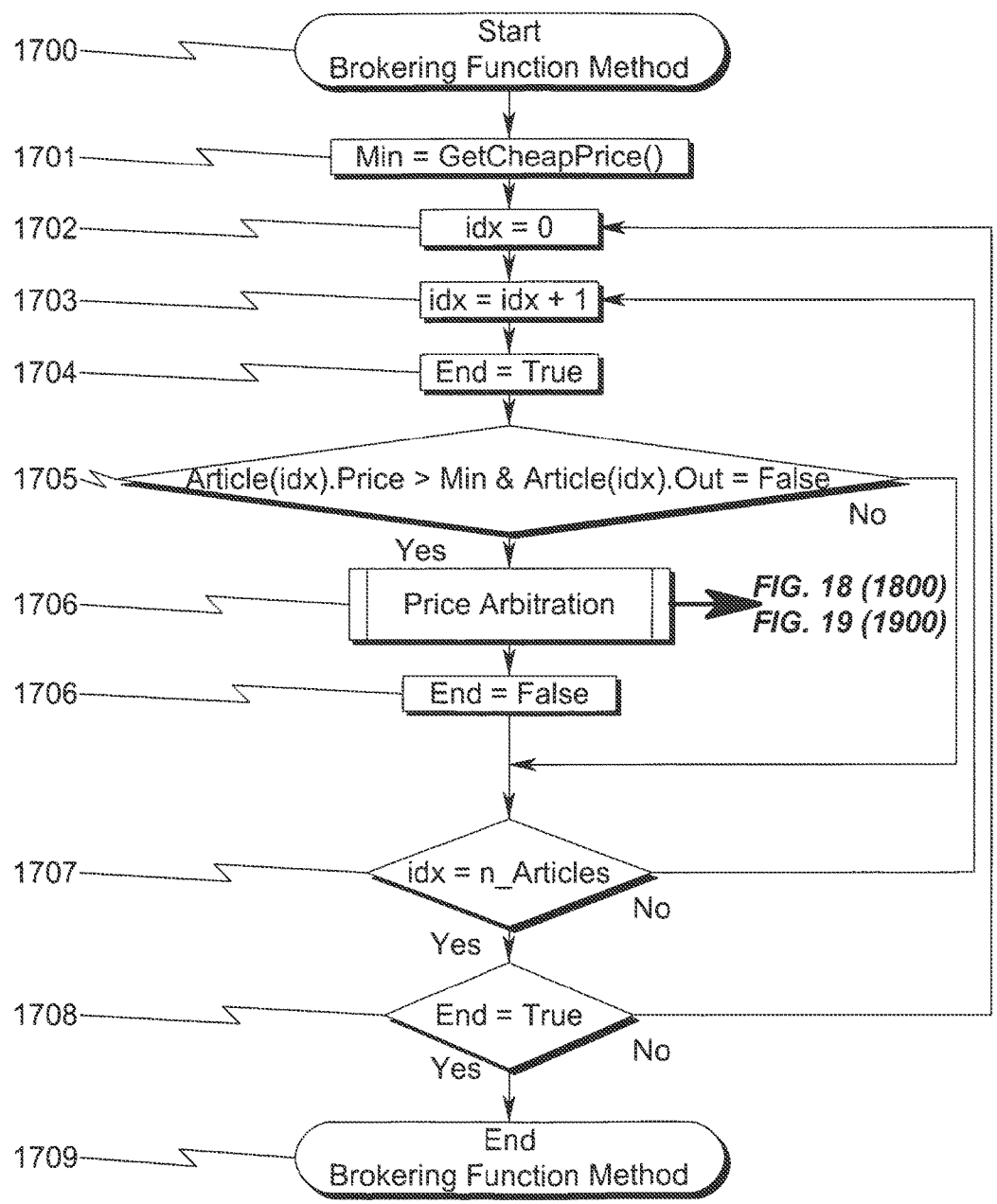
FIG. 17 illustrates an exemplary flowchart implementing a preferred exemplary embodiment of the invention method as applied to a brokering function method.
Figure 18:
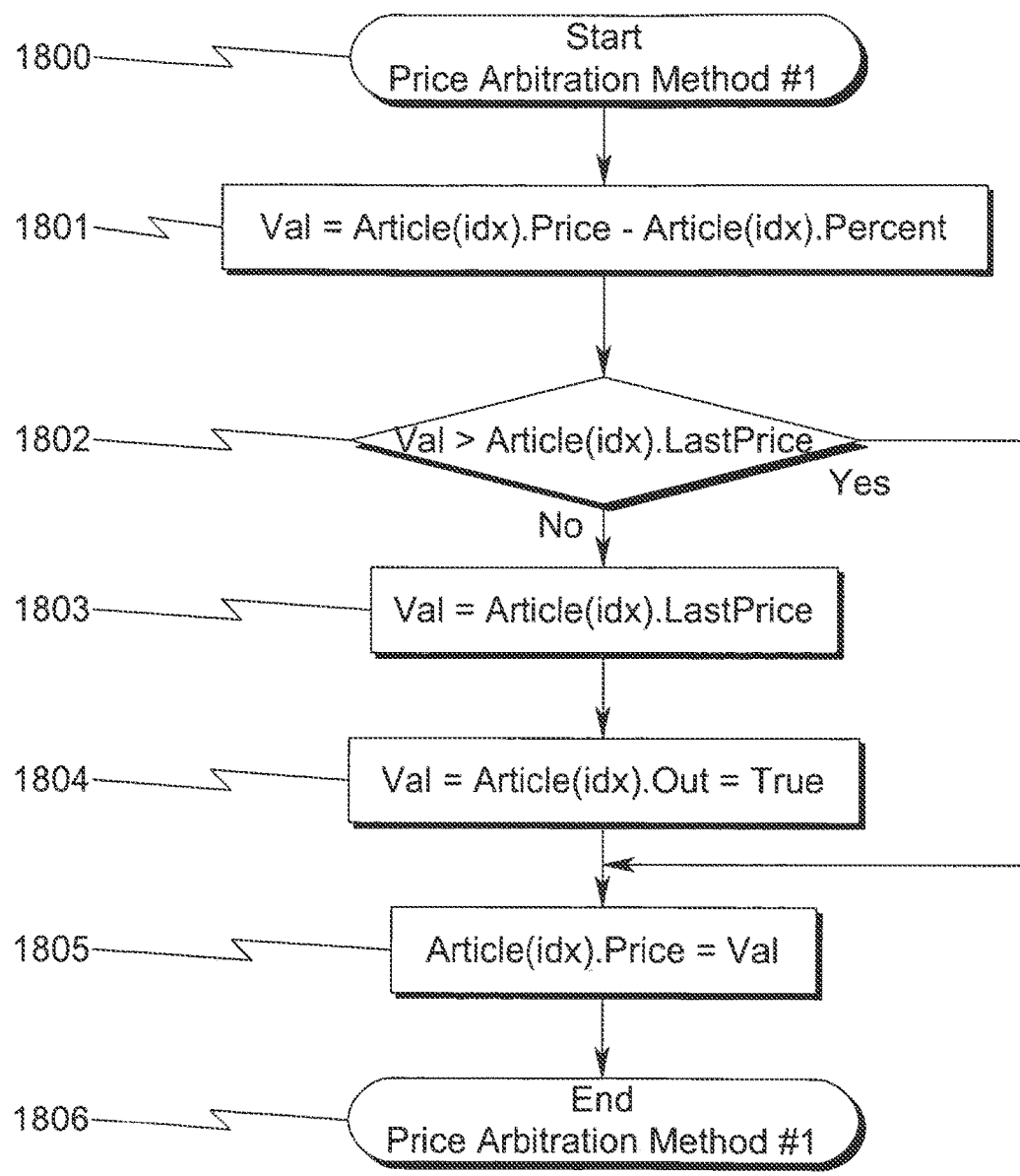
FIG. 18 illustrates an exemplary flowchart implementing a preferred exemplary embodiment of the invention method as applied to a price arbitration method.
Figure 19:
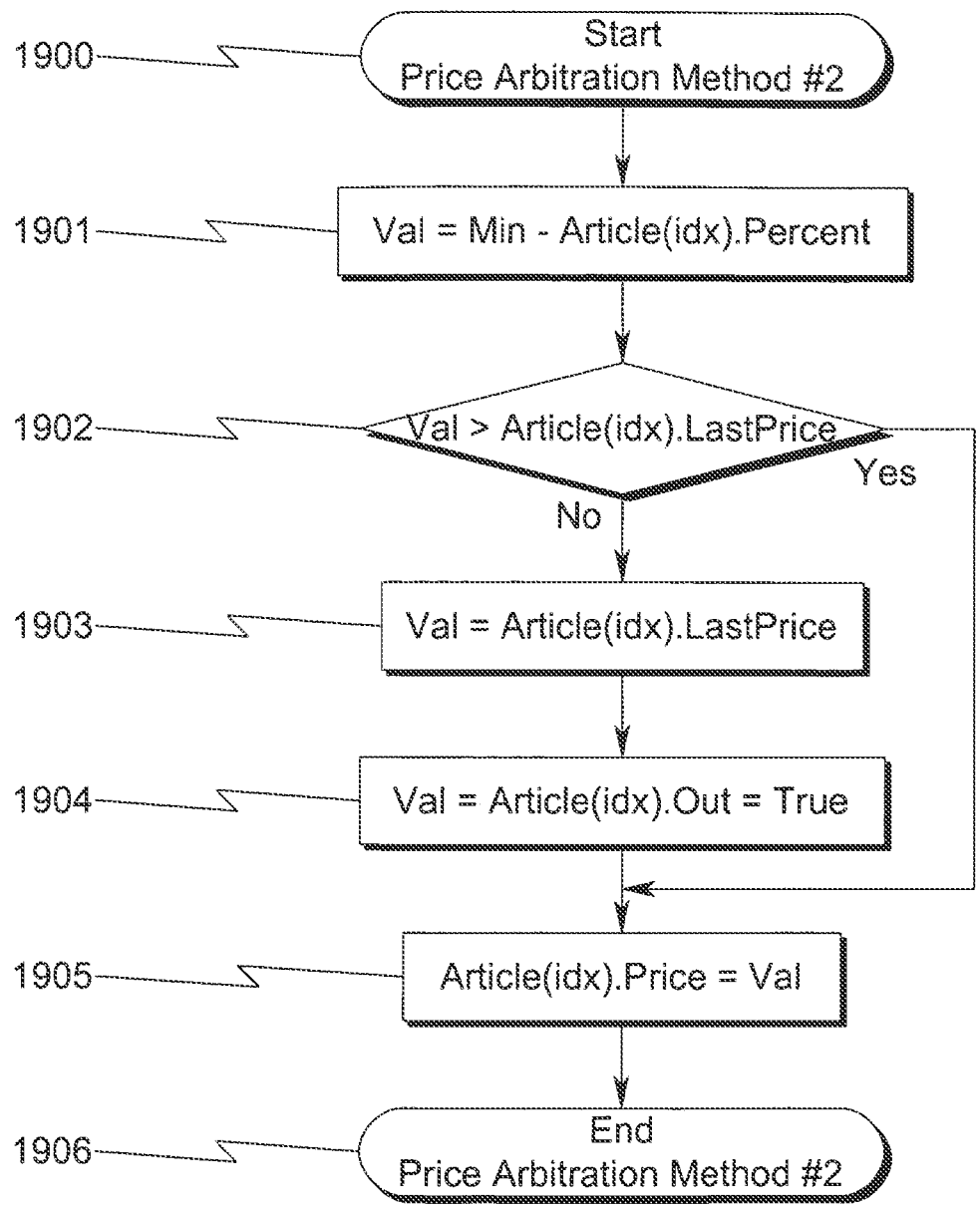
FIG. 19 illustrates an exemplary flowchart implementing a preferred exemplary embodiment of the invention method as applied to an alternate price arbitration method.

FIG. 15 (1500) illustrates a generalized arbitrage method and how the lowest price for any given product or products are determined, where (1510, 1520, 1530, 1540) are representative of the group of parameters selected by each participating merchant as detailed in items (1303, 1304). The amount of merchant data boxes depends on the number of merchants selected by a consumer during any given request for quotation, depending on the search range as defined under FIG. 12. A four merchant format has been adopted for the purpose of this example. Parameters (1513, 1514, 1523, 1524, 1533, 1534, 1543, 1544) are hidden and are only known and available to be viewed by each correspondent merchant, these are customized as necessary on the merchant's input page, only the base price (1512, 1522, 1532, 1542) and the name of the merchant are to be displayed on an interactive screen for the consumer to use.

Items (1512, 1522, 1532, 1542), are indicative of the regular base price for the item being quoted, this price would be the price which the merchant will normally sell the product to the general public without any discount. Items (1513, 1523, 1533, 1543) are indicative of the maximum discount which the merchant is willing to give in order to sell the product to a participant consumer requesting a quote. Items (1514, 1524, 1534, 1544) are indicative of the percentage which the merchant is willing to go under the lowest competitor price, each group of merchant parameters interact with other parameters generated by competing merchants to achieve a dynamic unattended bidding process between merchants in response to a customer request-for-quote.

Item (1505), illustrates an exemplary format on how the name of the various participating merchants (A, B, C, D) and their corresponding base prices are presented to the consumer in preparation for the bidding process, once the consumer decides to initiate the bidding process, the "compete" button (1506) is activated and the automatic bidding process is performed, once completed, the final results are displayed in a (1507) format for the consumer to pick the optimum price which in the case of this example is merchant B and the final best price is $104.42.

Between steps (1505) and (1507), a sequence of calculations is performed until the factors of all of the merchant parameters have been implemented and have reached their limit. A detailed example of this sequence is represented in FIG. 16 (1600) where item (1601) shows the results obtained after the first round of the sequence where it can be appreciated that all of the merchant prices have been reduced in relation to the lowest starting price of one of the competitors, being competitor "C" with a price of $129.95, therefore merchant "A" went 2% under $129.95 for a new price of $127.35, the price of merchant "B" went 1% under $129.95 for a new price of $128.65, the price of merchant "C" remained the same as it was already the lowest, and the price of merchant "D" went 1% under $129.95 for a new price of $128.65.

Since none of the four competing merchants reached their maximum discount price (A—23%), (B—38%), (C—15%) and (D—25%) the process is repeated on a second round (loop) and so on.

On the $8^{th}$ round or step (1608), it can be appreciated that participating merchant "C" reached its maximum discount of (15%) for a minimum price of $110.54, this merchant is now out of the bidding process. This figure is repeated on subsequent rounds indicating that it has reached its maximum.

On the $9^{th}$ round or step (1609), it can be appreciated that participating merchant "D" reached its maximum discount of (25%) for a minimum price of $109.49, this merchant is now out of the bidding process. This figure is repeated on subsequent rounds indicating that it has reached its maximum.

On the $11^{th}$ round or step (1611), it can be appreciated that participating merchant "A" reached its maximum discount of (23%) for a minimum price of $105.48, this merchant is now out of the bidding process. This figure is repeated on the last round indicating that it has reached its maximum.

On the last round or step (1507) participating merchant "B" goes 1% under the then lowest price of $105.48 for a new final and lowest price of $104.42. It should be noted that the winning merchant did not have to go to its maximum discount of 38% or $97.95 to win the bid but only applied the preset 1% under the lowest competing merchant as the lowest competing merchant had already reached its maximum discount.

The entire process described above is started and completed instantly at the click of a button.

Exemplary Software Screen Shots (2000, 2100, 2200)

The present invention may incorporate bid arbitration functions that are generally illustrated in the exemplary software code sequences illustrated in FIGS. 23-32. Exemplary screen shots of software implementing these basic bidding functions are illustrated in FIGS. 20-22.

FIG. 20 illustrates a situation in which a baseline set product prices ($136.99, $157.99, $129.95, $145.99) are associated with various merchants who have associated fixed minimum price point discount percentages (23%, 38%, 15%, 25%) and associated price reduction percentages (2%, 1%, 2%, 1%). FIG. 20 illustrates the situation in which the merchants simultaneously bid against one another to produce a lowest terminal price point ($105.48, $104.43, $110.46, $109.49) for each merchant, with the lowest price of $104.43 being the winning bid.

FIGS. 21-22 illustrate a similar initial condition for the merchants with each screen indicating the results after one pass of the merchant bidding function. As can be seen, the results for each merchant bid will be modified based on the results of other merchant bids and the function constraints posed by the merchant functions.

One skilled in the art will recognize that these figures illustrate only exemplary implementations of bidding functions for individual merchants and that there are a wide variety of functions possible for a given merchant to respond to bids placed by other merchants and constraint parameters posed by the consumer.

Exemplary Software Code (2300-3200)

The present invention may be implemented using a variety of software code sequences, but an exemplary preferred implementation is illustrated in FIGS. 23-32 (2300, 2400, 2500, 2600, 2700, 2800, 2900, 3000, 3100, 3200). One skilled in the art will recognize that a wide variety of implementations are possible using the teachings of the present invention, and the illustrated code sequences are only one of a wide variety of possible implementations.

Telephone/PDA Hosting

The present invention anticipates that the transaction arbiter and/or merchant function database may be hosted by a telephone (wired or wireless) or a PDA, collectively referred to as a "telephone" in this document.

Merchant Function Selection

The present invention anticipates that the merchant functions that comprise the merchant function database may be stock or predefined functions defined by the transaction arbiter but selected by the individual merchants, or alternatively completely unique functions defined by each individual merchant participating in the transaction arbiter environment. In the latter case, the merchants may incorporate proprietary sales analysis and pricing methodologies as well as using history of past successful and unsuccessful bidding results to modify their bidding strategy dynamically for future RFQs.

Unattended Bid Evaluation

The present invention anticipates that in many preferred embodiments the transaction arbiter will evaluate merchant functions to determine the winning bid in an unattended and autonomous manner, without human assistance. This methodology permits simultaneous evaluation of all merchant functions to determine the optimal bid price for a given set of customer RFQ parameters.

Communications Variations

The present invention anticipates that a wide variety of communication methodologies may be applicable to connect the customer to the transaction arbiter, permitting placement of RFQs and return of firm price bids. Additionally, merchants may interact with the transaction arbiter and the merchant function database in a wide variety of ways, using both direct and indirect communication through the transaction arbiter. The transaction arbiter in many circumstances may perform other functions in addition to maintenance of the merchant function database, including statistical analysis of RFQs, successful and unsuccessful bids, and resulting optimal price bids. This information may in some preferred embodiments be shared with the merchants and/or merchant functions to enhance system performance and permit more optimal bidding by merchants.

System Variations

The present invention anticipates a wide variety of variations in the basic theme of construction. The examples presented previously do not represent the entire scope of possible usages. They are meant to cite a few of the almost limitless possibilities.

Conclusion

A transaction arbiter system and method has been disclosed which incorporates a merchant function database under control of a transaction arbiter that permits merchants to interact in an automated way with bids generated by other merchants. Rather than utilizing fixed price schedules as taught by the prior art, the present invention permits each merchant to define a set of functions which describe how the merchant will respond to a customer request-for-quote for a given product or service. These merchant functions interact with both the customer request-for-quote and the results of other merchant functions to generate a dynamic real-time bidding system which integrates competition among merchant bidders to achieve an optimal consumer price for a given product or service.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. An improved system for generating at least one real-time or near real-time quote for a product or service, comprising:
  a mobile software application operatively connected to a multifunctional mobile device; said mobile software application configured as a mediating unit for the integration and processing of data between said multifunctional mobile device and a remote server system via at least one high-speed cellular mobile data communication network; said at least one high-speed cellular mobile data communication network configured to simultaneously sending and receiving data to, from and between said remote server system and said multifunctional mobile device via said mobile software application;
  at least one database storing provider data relating to a plurality of providers and to products or services provided by the plurality of providers, wherein the provider data or the product data or service comprise quoting data, wherein the plurality of providers comprise at least one of: one or more merchants, one or more service providers, or combinations thereof;
  a remote server system located on a communication network having one or more mobile application servers and one or more processors therein; said server system storing executable instructions that configure the one or more processors to:
    synchronize, over the communication network, the at least one database with at least one of a plurality of remote databases, wherein the plurality of remote databases are associated with the plurality of providers and store current provider data and product or service data being used by the plurality of providers;
    preprocess, at least some of the provider data and product or service data for runtime use, the preprocessing including the following operations:
    generate, based on the provider data, a first data structure that organizes the provider data based on geographic locations of the plurality of providers, wherein the first data structure is formatted and configured for identifying providers located within a geographic area;
    generate, based on the provider data, a second data structure that organizes the provider data further based on categories for the plurality of providers, wherein the second data structure is formatted and configured for identifying providers that provide particular categories of products or services identified in a query; and
    store, at least temporarily, the first data structure and the second data structure in a manner to permit access during runtime;
    receive, via the at least one high-speed cellular mobile data communication network, data captured via the multifunctional mobile devise to which the mobile software application is operatively connected to, wherein at least some of the said captured data is unknown to the system until after capture; wherein the multipurpose mobile device comprises at least part of a communication exchange architecture configured to improve the quality, the speed and the capacity of data processing and data transmission to and from the at least one remote server system via the at least one high-speed cellular mobile data communication network: said multifunctional mobile device comprising integrated scanner components, integrated global positioning components, and integrated communication components; said integrated components configured to improve the quality, speed and capacity of data processing and transferring; the multifunctional mobile device further comprising one or more mobile operating systems, and at least one mobile application processor;
    merge, via the operatively connected mobile software application the captured data with other stored data in preparation to sending a request to the server system receive in real-time or near real-time, from the remote multipurpose mobile device via the at least one high-speed cellular mobile data communication network, a user specified request for a particular product or service, wherein the user specified request is received with at least one of captured location information that identifies a current geographic location for the multifunctional mobile device and with product or service identifying information, wherein the geographic information is captured via integrated GPS components; wherein at least some information included in the user specified request is obtained via the multifunctional mobile device via the integrated mobile application and two or more of the integrated scanner components, the integrated global positioning components, and the integrated communication components;

obtain, in real-time or near real-time relative to receiving the user specified request, quote data for the particular product or service from at least a portion of the plurality of providers in response to the user specified request, the obtaining including the following operations:

identify, from among the plurality of providers, a group of one or more providers that are associated with one or more locations within a threshold distance of the current geographic location of the multifunctional mobile device by searching the first data structure using, the current geographic location;

identify, from among the group of one or more providers, a subgroup of the one or more providers providing the particular product or service by searching the second data structure using, at least, (i) a category for the particular product or service and (ii) information identifying the group of the one or more providers;

access one or more functions to be used for the subgroup of the one or more providers, wherein at least one of the one or more functions identifies (i) product or service quote and (ii) preauthorized dynamic quote adjustments; wherein the functions include one or more provider-specific functions or parameters, one or more system-specific functions or parameters, or combinations thereof; wherein at least one of said functions defines an algorithm that, when performed, arbitrates a particular quote from among a plurality of possible quotes based on one or more parameters derived from, the provider data, from the particular product or service or a combination thereof assemble, format and configure the provider data, the product or service data the quote data, the captured data and at least one quote adjusting functions in preparation for run time;

determine quotes for at least one provider of the subgroup of the one or more providers by performing each of the subgroup of one or more functions for the particular product or service relative to the performance of other functions, wherein the functions are configured to vary the quotes based upon the provider data relating to the plurality of providers, to the particular product or service or a combination thereof; and provide, in real-time or near real-time via the at least one high-speed mobile cellular data communication network, at least one quote for at least one corresponding provider from the subgroup of the one or more providers to the multifunctional mobile device, the quote specific to the location of the multifunctional mobile device, to other captured data and to the specific providers within a specified location or proximity parameters and to product data specified by the user.

2. The system of claim 1, wherein the one or more processors are configured to arbitrate a best quote most closely matching the particular product or service identified in the user specified request.

3. The system of claim 1, wherein at least one of the functions are programmed to model quoting adjustment behavior for a corresponding provider based on provider data for at least one other provider.

4. The system of claim 1, wherein the at least one of the functions include adjustable quoting data associated with the particular product or service.

5. The system of claim 1, wherein the one or more processors can perform multiprocessing functions and are further configured to provide, with the at least one quote, code that, when interpreted or executed by the multifunctional mobile device, causes the multifunctional device to generate a graphical interface to present with the at least one quote.

6. The system of claim 5, wherein the graphical interface further presents the at least one quote with a set of historical transaction prices and parameters in a curve or histogram.

7. The system of claim 1, wherein the provider data further comprises historical pricing data relating to the products or services provided by the plurality of providers.

8. An improved method for generating at least one real-time or near real-time quote for a product or service, comprising:

synchronizing, by a remote server system and over a communication network, at least one database with at least one of a plurality of remote databases that are associated with a plurality of providers that store current provider data being used by the plurality of providers, wherein the at least one database (i) stores provider data and product or service data related to products or services provided by the at least one of the plurality of providers and (ii) is accessible to the server system;

preprocessing, by the remote server system, the provider data and product or service data for runtime use, the preprocessing including:

generating, by the remote server system and based on the provider data, a first data structure that organizes the provider data based on geographic locations of the plurality of providers, wherein the first data structure is formatted and configured for identifying providers located within a geographic area;

generating, by the remote server system and based on the provider data, a second data structure that organizes the provider data further based on categories for the plurality of providers, wherein the second data structure is formatted and configured for identifying providers that provide a category of products or services identified in a query; and storing, by the server system at least temporarily, the first data structure and the second data structure in a manner to permit access during runtime;

capturing data via a multifunctional mobile devise to which a mobile software application is operatively connected to, wherein at least some of the said captured data is unknown to the system until after capture;

merging the captured data with other stored data in preparation to sending a request to the server system;

receiving in real-time or near real-time, at the remote server system, from the multifunctional mobile device, and via at least one high-speed cellular mobile data communication network, a user specified request for a particular product or service, wherein the user specified request is received with at least one of captured location information that identifies a current geographic location for the remote multifunctional hand held mobile user device and with product or service identifying information wherein the geographic information is captured via integrated GPS components; Wherein at least some information included in the user specified request is obtained by the multifunctional mobile device via the operatively connected mobile application and at least two of the integrated scanner components, the integrated global positioning components, and the integrated communication components obtaining, by the remote server system in real-time or near real-time relative to receiving the user specified request, quote data for the particular product or service from at least a portion of the plurality of providers in response to the user specified request, the obtaining including:

identifying, by the remote server system and from among the plurality of providers, a group of providers located within a threshold distance of the current geographic location of the remote multifunctional handheld mobile user device by searching the first data structure using, at least, the current geographic location;

identifying, by the remote server system and from among the group of providers, a subgroup of providers providing the particular product or service by searching the second data structure using, at least, (i) a category for the particular product or service and (ii) information identifying the group of providers;

accessing, by the remote server system one or more functions to be used for the subgroup of providers, wherein the one or more functions identifies (i) one or more product or service quotes and (ii) dynamic quote adjustments that are preauthorized; wherein at least one of the said functions defines an algorithm that, when performed, arbitrates a particular quote from among a plurality of possible quotes based on one or more parameters derived from, the provider data, from the particular product or service or a combination thereof assembling, formatting and configuring the provider data, the product or service data the quote data, the captured data and at least one function in preparation for run time;

determining, by the remote server system, quotes for at least one of the subgroup of one or more providers by performing each of the one or more functions for the particular product or service relative to the performance of other functions, wherein the functions are configured to vary the quotes based upon one or more of the provider data relating to the plurality of providers, to the particular product or service or a combination thereof; and providing, by the remote server system in real-time or near real-time and via the at least one high-speed cellular mobile data communication network, at least one quote for at least one corresponding provider from the subgroup of providers to the multifunctional mobile device that provided the user specified request, the quote specific to the location of the remote multifunctional mobile device, to captured data and to specific providers within a specified location and proximity parameters and to product data specified by the user.

9. The method of claim 8, wherein a best quote most closely matching the particular product or service is selected as the at least one quote.

10. The method of claim 8, wherein each of the functions are programmed to model quote adjustment behavior for a corresponding provider based on provider data for at least one other provider.

11. The method of claim 8, wherein the functions include adjustable quote data associated with the particular product or service.

12. The method of claim 8, further including providing, with the at least one quote, code that, when interpreted or executed by the multifunctional mobile device, causes the multifunctional mobile device to generate a graphical interface to present with the at least one quote.

13. The method of claim 12, wherein the graphical user interface displays the at least one quote with a set of historical transaction prices and parameters in a curve or histogram.

14. The method of claim 8, wherein the provider data further comprises historical pricing data relating to the products or services provided by the plurality of providers.

15. An improved system for generating a real-time or near real-time bid for a product or service, comprising:

a mobile software application operatively connected to a multifunctional mobile device; said mobile software application configured as a mediating unit for the integration and processing of data between said multifunctional mobile device and a remote server system via at least one high-speed cellular mobile data communication network; said at least one high speed cellular mobile data communication network configured for simultaneously sending and receiving data to, from and between said remote server system and said multifunctional mobile device via said mobile software application;

at least one remote database storing provider data relating to a plurality of providers and to products or services provided by the plurality of providers, wherein the provider data or the product or service data comprise biding data;

a remote server system comprising one or more mobile application servers and located on a communication network having one or more processors therein, said remote server system storing executable instructions that configure the one or more processors to:

preprocess the provider data for runtime use, the preprocessing including the following operations:

generate, based on the provider data, a data structure that organizes the provider data based on categories for the plurality of providers, wherein the data structure is formatted and configured for identifying providers that provide a category of products or services; and store, at least temporarily, the data structure in a manner to permit access during runtime;

receive, via the at least one high-speed cellular mobile data communication network data captured via the multifunctional mobile devise to which the mobile software application is operatively connected to; wherein the multipurpose mobile device comprises at least part of a communication exchange architecture configured to improving the quality, the speed and the capacity of data processing and data transmission to and from the at least: one remote server via the at least one high-speed mobile cellular data communication network; said multifunctional mobile device further comprising integrated scanner components, integrated global positioning components, and integrated communication components, said integrated components configured for improving the quality, speed and capacity of data processing and data transferring; the multifunctional mobile device further comprising one or more mobile operating systems, and at least one mobile application processor;

merge, via the operatively connected mobile software application the captured data with other stored data in preparation to sending a request to the server system receive in real-time or near real-time, from the multipurpose mobile device via the operatively connected software application and via the at least one high-speed mobile cellular data communication network a request for a particular product or service;

obtain, in real-time or near real-time relative to receiving the request, bidding data related to the particular product or service from at least a portion of the plurality of providers in response to the request, the obtaining including the following operations:

identify, from among the plurality of providers, a group of providers associated with the particular product or service by searching the data structure using, at least, a category for the particular product or service;

access, one or more real time bidding functions wherein each of the one or more real time bidding functions identifies (i) bidding information and (ii) preauthorized dynamic bid adjustments, wherein the real time bidding functions include at least one of system-specific bidding functions or parameters; where in the at least one bidding functions defines an algorithm that, when performed, identifies a particular bid from among a plurality of possible bids based on one or more parameters derived from, at least, the provider data;

assemble, format and configure the provider specific data, the product or service data the bidding data, and at least one bidding function in preparation for run time, determine at least one bid for at least one of the group of providers by performing one or more of a group of real time bidding functions associated with the particular product or service relative to the performance of other functions, wherein the one or more bidding functions are configured to vary the bids based upon the provider data relating to the plurality of providers and to the particular product or service; and provide, in real-time or near real-time via the at least one high-speed mobile cellular data communication network, information associated with the at least one bid and at least one corresponding provider from the group of providers to the remote multifunctional hand held mobile user device that provided the user specified request via the operatively connected software application.

16. The system of claim 15, wherein the one or more processors are further configured to synchronize, over the communication network, the at least one database with a plurality of at least one remote databases that are associated with at least one of the plurality of providers and that store current provider data being used by the plurality of providers.

17. The system of claim 15, wherein the preprocessing further includes the following operation:

generate, based on the provider data, an additional data structure that organizes the provider data based on geographic locations of the at least one of the plurality of providers, wherein the additional data structure is formatted and configured for identifying providers located within a geographic area, wherein the quotes are obtained further using the additional data structure.

18. The system of claim 17, wherein:

the request is received with location information that identifies a current geographic location for the multifunctional mobile device, wherein the geographic information is captured via integrated GPS components; and the bids are obtained further based on the location information.

19. The system of claim 18, wherein the obtaining further includes the following operation:

identify, from among the group of one or more providers, a subgroup of one or more providers located within a threshold distance of the current geographic location of the multifunctional mobile device by searching the first data structure using, at least, the current geographic location, wherein the accessing, the determining, and the selecting are performed using one or more of the subgroup of providers.

20. The system of claim 15, wherein the one or more processors are configured to arbitrate, from among the bids, a best bid most closely matching the particular product or service identified in the request.

21. The system of claim 15, wherein each of the real time bidding functions is programmed to model pricing adjustment behavior for a corresponding provider based on provider data for at least one other provider.

22. The system of claim 15, wherein the provider data includes current versions of provider-specific bidding parameters that are added to an index of pricing functions upon receipt.

23. The system of claim 15, wherein the bidding functions include adjustable bidding data associated with the particular product or service.

24. The system of claim 15, wherein:

the multifunctional mobile device comprises at least one of a cell phone, a mobile device, and a computer, the at least one of the cell phone, the mobile device, and the computer is an individual tool that includes integrated scanner components, integrated global positioning components, and integrated communication components, and at least some information included in the specified request is obtained by the multifunctional mobile device using two or more of the integrated scanner components, the integrated global positioning component, and the integrated communication components.

25. The method of claim 15, wherein the information provided to the multifunctional mobile device via the operatively connected software application in real-time or near real-time and via the at least one high-speed mobile cellular data communication network comprises at least one advertisement.

26. An improved method for generating a real-time bid for a product or service, comprising:

preprocessing, by a remote server system, the provider data and the product or service data for runtime use, the preprocessing including:

generating, by the remote server system and based on the provider data and the product or service data, a data structure that organizes the provider data based on categories for the plurality of providers, wherein the data structure is formatted and configured for identifying providers that provide a category of products or services; and storing, by the remote server system at least temporarily, the data structure in a manner to permit access during runtime;

capturing data via a multifunctional mobile device and the operatively connected mobile software application;

merging the captured data with other stored data in preparation to sending a request to the remote server system;

receiving in real-time or near real-time, at the remote server system, from the multifunction mobile device via the operatively connected software application, and via the at least one high-speed cellular mobile data communication network, a request for a particular product or service;

obtaining, by the remote server system in real-time or near real-time relative to receiving the user specified request, a bid related to the particular product or service from at least a portion of the plurality of providers in response to the request, the obtaining including:

identifying, by the remote server system and from among the plurality of providers, a group of providers associated with the particular product or service by searching the data structure using, at least, a category for the particular product or service;

accessing, by the remote server system and using one or more real time bidding functions to be used for the group of providers, wherein each of the one or more bidding functions identifies (i) bidding information and (ii) preauthorized dynamic bid adjustments, wherein the bidding functions include at least one of system-specific functions and parameters; and assembling, formatting and configuring the provider data, the product or service data, the bid data, and at least one bidding function to generate a result, determining, by the remote server system, at least one bid for at least one of the group of providers by performing one or more of a group real time bidding functions associated with the particular product or service relative the performance of other functions, wherein the bidding functions are configured to vary the bids based upon the provider data relating to the plurality of providers, to the particular product or service or combination thereof; and providing, by the remote server system in real-time and over the at least one high-speed cellular mobile data communication network, information associated with the at least one bid for at least one corresponding provider from the group of providers to the multifunctional mobile device that provided the request via the operatively connected software application.

27. The method of claim 26, further comprising:

synchronizing, by the remote server system and over the communication network, at least one database with a plurality of at least one remote databases that are associated with at least one of the plurality of providers and that store current provider data being used by the plurality of providers, wherein the at least one database (i) stores provider data related to products or services provided by the plurality of providers and (ii) is accessible to the remote server system.

28. The method of claim 26, wherein the preprocessing further includes:

generating, by the remote server system and based on the provider data, an additional data structure that organizes the provider data based on geographic locations of the at least one of the plurality of providers, wherein the additional data structure is formatted and configured for identifying providers located within a geographic area, wherein the bids are obtained further using the additional data structure.

29. The method of claim 28, wherein:

the request is received with location information that identifies a current geographic location for the multifunctional mobile device wherein the geographic information is captured via integrated GPS components, and the quotes are obtained further based on the location information.

30. The method of claim 29, wherein the obtaining further includes:

identifying, by the remote server system and from among the group of one or more providers, a subgroup of one or more providers located within a threshold distance of the current geographic location of the multifunctional mobile device by searching the additional data structure using, at least, the current geographic location, wherein the accessing, the determining, and the selecting are performed using one or more of the subgroup of providers.

31. The method of claim 26, wherein a best price most closely matching the particular product or service is selected as the at least one bid.

32. The method of claim 26, wherein at least one of the real-time bidding functions is programmed to model bidding adjustment behavior for a corresponding provider based on provider data for at least one other provider.

33. The method of claim 26, wherein the provider data includes current versions of provider-specific bidding parameters that are added to an index of functions upon receipt.

34. The method of claim 26, wherein at least one of the real-time bidding functions defines an algorithm that, when performed, identifies a particular bid from among a plurality of possible bids based on one or more parameters derived from, at least, the provider data.

35. The method of claim 26, wherein at least one of the real-time bidding functions include adjustable bid data associated with the particular product or service.

36. The method of claim 26, wherein:

the multifunctional mobile device comprises at least one of a cell phone, a mobile device, and a computer, the at least one of the cell phone, the mobile device, and the computer is an individual tool that includes integrated scanner components, an integrated global positioning components, and integrated communication components, and at least some information included in the request is obtained by the multifunctional mobile device using the scanner components, the global positioning components, and the communication components.

37. The method of claim 26, wherein the information provided to the multifunctional mobile device via the operatively connected software application in real-time or near real-time and via the at least one high-speed mobile cellular data communication network comprises at least one advertisement.

\* \* \* \* \*